United States Patent [19]
Thompson et al.

[11] Patent Number: 5,463,772
[45] Date of Patent: Oct. 31, 1995

[54] TRANSPARENT PERIPHERAL FILE SYSTEMS WITH ON-BOARD COMPRESSION, DECOMPRESSION, AND SPACE MANAGEMENT

[75] Inventors: Bruce A. Thompson, Highlands Ranch; David J. Van Maren, Ft. Collins; John G. McCarthy, Thornton; R. Andrew Purcell, Ft. Collins; Michael Rottinghaus, Greeley, all of Colo.

[73] Assignee: Hewlett-Packard Company, Palo Alto, Calif.

[21] Appl. No.: 52,437

[22] Filed: Apr. 23, 1993

[51] Int. Cl.$^6$ ............................ G06F 13/12; G06F 17/30
[52] U.S. Cl. .................... 395/600; 395/439; 395/444; 395/281; 395/481; 364/962.1; 364/952; 364/968; 364/256.3; 364/280.4; 364/DIG. 2; 364/DIG. 1
[58] Field of Search ................................ 395/600, 425, 395/250, 275

[56] References Cited

U.S. PATENT DOCUMENTS

| | | | |
|---|---|---|---|
| 4,918,588 | 4/1990 | Barrett et al. | 395/600 |
| 5,001,628 | 5/1991 | Johnson et al. | 395/600 |
| 5,077,737 | 12/1991 | Leger et al. | 371/10.1 |
| 5,126,739 | 6/1992 | Whiting et al. | 341/106 |
| 5,163,131 | 11/1992 | Row et al. | 395/200 |
| 5,218,685 | 6/1993 | Jones | 395/425 |
| 5,231,616 | 7/1993 | Oliver et al. | 369/34 |
| 5,262,875 | 11/1993 | Mincer et al. | 358/335 |
| 5,357,614 | 10/1994 | Pattisam et al. | 395/250 |

OTHER PUBLICATIONS

A Reference Model for Mass Storage Systems by Stephen W. Miller, Advances in Computers, vol. 27, pp. 157–210, 1988.

Louis Costrell, "FASTBUS for Data Acquisition and Control", *IEEE Transactions on Nuclear Science*, vol. NS–30, No. 4, Aug., 1983, pp. 2147–2151.

*Primary Examiner*—Thomas G. Black
*Assistant Examiner*—Paul R. Lintz
*Attorney, Agent, or Firm*—Edward L. Miller

[57] ABSTRACT

A Transparent Peripheral File System (TPFS) includes a Peripheral File System Adapter (PFSA) which communicates with a host operating system at the vnode level of file operation by packaging such communications for transmission over an I/O system interface, such as SCSI. A file peripheral system remote from the host and in a peripheral relation thereto is responsive to the PFSA, without an intervening file server. The peripheral file system produces hardware commands for the mass storage device whose space it manages. The peripheral file system may be embedded in a mass storage device, a lump in the interconnecting interface cable, or a smart interface card in the backplane of the host. The peripheral file system may include a daisy chain connection to allow the propagation of vnode communication to other peripheral file systems. In this way a hierarchy of peripheral file systems may be physically mounted to one another in a way that corresponds to how they are logically mounted. A Character To File Translator (CFX) allows a TPFS to emulate raw mode access, even if the host system is not equipped with a vnode file operation interface. CFX does this by converting to and from streams of characters communicated with an application using this ersatz raw mode, while instead of storing the data on the storage medium itself, actually relying upon the remote peripheral file system for storing, or having stored, the streams of characters as a file.

22 Claims, 7 Drawing Sheets

TRANSPARENT PERIPHERAL FILE SYSTEMS WITH ON-BOARD COMPRESSION, DECOMPRESSION, AND SPACE MANAGEMENT

BACKGROUND OF THE INVENTION

1. Introduction

Today, as in the past, computers almost never have enough self-contained read/write (R/W) memory to do all that is required of them, and various forms of external mass storage such as tapes and discs are used as peripherals to provide extra memory. In a conventional system the management of the tasks of storing and retrieving data from peripheral mass storage is performed by a portion of the operating system called the file system. Very briefly put, the file system keeps track of where things (identified by "file names") are located in terms of physical (medium related) addresses, and converts relatively high level file operation requests into corresponding sequences of hardware level commands that appear as I/O traffic directed to one or more mass storage peripherals.

2. File Systems

Even for a computer system that dispensed with peripheral mass storage because it actually had more addressable R/W memory than the largest amount of information to be stored in or manipulated by the computer, a file system would still be a useful thing. Such a file system would manage the task of sorting and retrieving files of information from R/W memory, instead of from a peripheral. It is important to realize that a file system can provide a paradigm for the organization of related data into collections regardless of where they are stored, and is actually more than simply a friendly interface to an otherwise hard-to-use dumb peripheral.

Nevertheless, most file systems have started out as tools for the management of information stored on mass storage peripherals, such as tape and disc drives, and were developed to run under particular operating systems. The prevalent types of mass storage having high capacity and high speed were mainly variations of rotating magnetizable media: drums, fixed head hard discs, moving head hard discs (with removable packs), floppy discs, and eventually the so-called "winchester" discs. Despite their differences, these different techniques have a lot in common concerning how the file system reads and writes to them, and how it goes about managing the storage space presented by medium. That is: Addressing is surface-track-sector, and the minimum quanta of information to be read or written is a sector containing a certain number of bytes; Read and write operations are always freely permitted at all addresses, with any erase phase bundled into the write operation by virtue of how the hardware is constructed. Accordingly, except for minor adjustments to accommodate issues such as sector size and number of tracks per surface, a file system could treat the basic space management issues of all disc drives in pretty much the same way. The operating system and its file system were thought of as (magnetic) disc based, and if later there appeared some other mass storage technology requiring a significantly different space management paradigm, well, then a separate subsystem was going to be needed to make it work.

Many current operating systems and their file systems had their origins at a time when data compression technology was either nonexistent or was in its infancy. As an issue, data compression was, and in many respects continues to be, ignored by developers and maintainers of these now popular operating systems and their associated file systems. The system calls and file structure for a popular operating system and its file system become de facto, if not actual, industry standards. Much ancillary hardware and software gets developed and then sold to customers on the premise that these standards can be trusted to impart a relatively stable economic value to those hardware and software products. It is expected, then, that evolutionary improvements in an operating system and its file system will be backwards compatible, so that old products will continue to run on new systems.

Today, data compression is a robust and well developed technology. Conventionally, however, it has been treated as an adjunct to the file system, since including it would have a severe impact on how the file system goes about its business; to date, data compression has generally not been transparent, and it makes files non-standard. Having become widely accepted, a desire for the continued use of the protocols and formats of popular operating systems and their file systems seems to suggest that data compression arrived too late to be incorporated therein.

These popular file systems were well suited for the environment for which they were originally developed, but they are not necessarily the best choices for today's much wider selection of peripheral mass storage technologies. In at least four areas a significant improvement in "performance" can be realized by: (a) incorporating data compression into the file system; (b) incorporating a file system "into" a mass storage peripheral (actually, it could be located at any of various places in series with the interface path between the computer and the peripheral); or, (c) both. Depending upon the circumstances, "performance" can be variously understood as either: speed; capacity; reduction in control complexity (simpler coupling of system elements); or, an increased level of functionality.

The four areas susceptible to increased performance are: (1) data compression of the actual information stored on the medium; (2) autochangers for either magnetic or optical media; (3) media where erasure must be performed as a separate operation prior to writing; and (4) WORM (write-once/read-many) drives. Naturally, the introduction of special or different file operation commands is to be avoided in favor of retaining the commands of the existing file system. Nor is it desirable to replace the existing file system; at most it should need minor augmentation to produce the desired "transparency". Last, no capability should be lost; the new system should be capable of all operations that the old system was, "without exception". (Within the limits of what makes sense, of course; one can't do a write operation to a CD-ROM file system, for example.)

Peripheral Mass Storage And File Systems

A brief digression will assist in appreciating how the conventional relationship between peripheral mass storage and file systems influences the topics of data compression, auto-changers, separate erasure and WORM. Broadly speaking, there are three ways that peripheral mass storage can be managed for the storage of programs and data. (Peripheral mass storage is memory not accessible by ordinary read and write memory cycles performed as part of the CPU's memory reference instruction set, but dependent instead upon I/O instructions.)

The first and most primitive of these three ways is to simply maintain tables of correspondence between collections of related data and "where" on the mass medium each particular collection is written. The notion of "where" is essentially an address, although it is not expressed as the usual hex or octal number in a linear arrangement of locations in R/W memory or ROM. Instead, the description of "where" reflects the physical nature of how the medium is organized. With half-inch tape, for example, data is separated from other data by gaps (i.e., stretches of tape with no recording) or by special recorded patterns called tape marks. In essence, data on tape can be described as being "in a collection so many gaps or marks past the beginning of the tape." On the other hand, discs have a surface/track/sector architecture. The most primitive way of managing data storage on a disc is to record someplace that the desired data is on surface l, track m, starting at sector n, and perhaps that it runs for some number of sectors, k. An incrementing scheme allows regular progression from track to track as the sector count increases past the number of sectors within a track.

A second way of providing external mass storage with discs is to devise an extended mapping between the address space for R/W memory and the description of the physical location on the mass storage medium, and then use the peripheral mass storage as "virtual memory." This mapping is automatically and programmatically accomplished by the operating system, since the native command set of the disc remains things like "move the heads to track m and start reading at sector n of surface l." Nevertheless, with a virtual memory system the user no longer needs to concern himself with where things are actually stored on the disc, and need not pay any attention to "surface/track/sector talk."

The third conventional way of managing the storage of information on a mass storage medium is through the agency of a "file system." Files have names, and the file system itself keeps track of where on the medium a given file is, what kind it is, how big it is, etc. Ordinarily, the file system is an integral component implemented within the operating system. (However, in some older disc based operating systems supporting track/sector calls for disc operation, the file manager was an optional subsystem). Requests for file operations (i.e., requests for a list of files and their size and status, commands to read a file, etc.,) are placed with the operating system, which in turn invokes the file system. The file system has general knowledge about the architecture of the particular mass storage device(s) upon whose medium the content of the file system resides. Its overall task is to provide the algorithms that implement the properties of the desired file system. There are generally several powerful tools at its disposal to assist in that implementation. These generally include buffering, interrupt driven I/O, DMA, and a structured division of labor in the software that includes "software drivers." The drivers have detailed particular knowledge about the command set for the mass storage device being used. Thus, the file system may be viewed as a rather large collection of program modules whose collective purpose is to accept commands, file names and other parameters (such as data in R/W that is to become a file) as input and produce therefrom an appropriate sequence of "surface/track/sector talk" that also exploits buffering, interrupt driven I/O, and DMA.

To summarize briefly before continuing, the three techniques for managing mass storage may be termed "direct access," "virtual memory" and "file system." Our interest here is, in part, how a file system can be implemented in a non-conventional way for the class of random access mass storage peripherals.

Historically, there are good reasons why the file system has been located in the CPU and implemented as part of the operating system. In the beginning, there were no microprocessors, and processing power (i.e., the ability to execute a program) was at as much of a premium as memory was. Since a file system contains a large number of algorithms, only a processor executing a program could hope to implement any sort of reasonable file system. At the same time, embedded control systems using microprocessors were still a thing of the future. Users and their programs interacted with the operating system, which after due processing gave tasks to software drivers that in turn communicated with interface cards dedicated to the particular peripheral. A cable conveyed the final low-level hardware commands to a controller in the peripheral. As the various enhancements, such as buffered I/O, interrupt driven I/O, DMA, and caching were developed to improve performance, corresponding changes were incorporated into the operating system, as well as into the other software systems using those enhancements. In this way the range of capabilities and the degree of performance of peripheral mass storage subsystems were both increased and optimized.

The situation was not ideal, however, since every time there was a change in the size or internal organization of the family of mass storage peripherals offered for a given computer system there had to be corresponding changes to the file system, drivers, interface cards and cables. Generally speaking, the expectation was that in the short run, a user who needed more peripheral mass storage would add more units (the operating system was built to accommodate that) rather than add bigger units. In the long run, a new generation of bigger (and faster) units required a new release of the file system, and also very possibly of the operating system.

Eventually, standardized hardware interfaces such as IEEE 488 and SCSI emerged as electrical interface vehicles, while the various manufacturers developed custom primitive hardware command sets and data formats for their discs. IEEE 488, for example, can be viewed as partly a hardware framework for the exchange of ASCII characters and as partly a protocol about the meaning of those transmitted characters. The protocol organizes issues of who is in control of the interface bus and how to distinguish between transmitted "meta commands" that affect the interface process itself and pertain to bus control (i.e., who talks and who listens) and the (mere) "customer's commands and data" to be exchanged between devices using the bus (e.g., a CPU and a peripheral). Under this scheme, if a peripheral is to be given a task, then it is sent a sequence of ASCII characters that represent an appropriate command in the peripheral's primitive hardware command set, rather than exerting a logic value on a dedicated control line whose meaning is specific to some internal function within that peripheral. Certain other housekeeping functions are provided by IEEE 488, such as the ability of the peripheral to request attention either in an asynchronous or an in an altogether unsolicited fashion. The development of the low cost microprocessor made practical the powerful embedded systems that made peripherals "smart" enough to implement the command set. These embedded systems also managed other improvements, such as automatic track sparing and the implementation of self-diagnostics and sophisticated error reporting. The emergence of standardized data formats allowed peripheral capacity issues to simply become variable parameters that were already provided for at the driver and operating system level. This allowed a peripheral to report its model number or describe its structure (and status) in response to a query. The driver's parameter values are then adjusted accordingly.

Meanwhile, operating systems moved away from the simple early file systems of the sort where, unless there was a large enough contiguous space available in the data already on the disc, the disc had to be packed to recover fragmented free space before the file could be stored. In place of such cumbersome systems hierarchial file systems became popular. One such system uses linked clusters of so many sectors each to store data. Each track contains an integral number of clusters, and clusters can be linked in any order. Another such system dispenses with clusters and simply maintains a file as a linked list of variable length extents, where an extent is a group of one or more contiguous sectors on the disc. These strategies solve a number of earlier problems in file systems, and a certain well known implementation of this for personal computers (PC's) and another for workstations have become standards for use with magnetic discs.

Networks

A network is a communication channel shared by a plurality of using computers. A hardware assisted protocol organizes the issues of source and destination for transmitted messages, and also arbitrates or manages which computer gets to use the channel at any given time. Frequently the purpose behind the network is more than simply permitting mere communication of disparate messages; often the major purpose is to allow the sharing of a major resource, such as a mass storage facility.

It is customary to classify the user computers as "clients" and the controllers of major shared resources as "servers". A server is a combination of a CPU, operating system and specialized application, and even if it is the server for a gigantic disc farm, probably has its own local mass storage for its private internal workings. Clearly, the notion of a client-server relationship on a network has implications for file systems.

Important among these implications, for our purposes, are the remote file systems. These cooperate with the file system in the client to store and retrieve client data using the server's mass storage facility. What is of most interest to us is the impact on the existing file system in the client, and the fact that the remote file system on a network requires the agency of a server. As is pointed out in the next section, since the mass storage units accessed by use of the server are peripherals of the server, the remote file system accessed by a client over a network is not located on a peripheral of the client.

Terminology: Hosts and Peripherals

The invention to be described pertains to the relationships between a computer and its mass storage peripherals. We use the term "host computer" to refer to a computer that originates activity to be carried out by a peripheral belonging to that computer. While this use of the term "host" has a long and honorable history, there is another use of the term that motivates the comments that follow.

The term "host" often gets mixed in with descriptions of "peers" and "client-server" relationships in a network environment. The user-programmable computers connected to a network are apt to all be peers sharing a common collection of resources. Computers that provide those resources are "servers". A server attempts to do what is requested by any client. A server does not have a private relationship with any of the clients on the network. And while the file system executed by the server may deny access to a particular user because of improper permissions, this is a contingent action obtained through the execution of the software on the server, and not an inescapable result following from the way the network interconnects the server with that particular client. Generally speaking, we won't have the network meaning in mind when we use the term "host" herein.

In contrast, by "host" is meant a computer that has a private relationship with a "peripheral". By "peripheral" we mean a device (usually, but not always) external to a computer and that always has an exclusive (as if monogamous) relationship with that computer: no other computer gets to (directly) tell the peripheral what to do. (To be sure, there are exceptions to this restrictive definition. There are print spoolers that accept input from a plurality of computers, and there have even been disc drive controllers that accepted input from two CPU's allowed to cause activity on one or more discs held in common. Our use of the word "peripheral" is a narrower one that excludes such promiscuous activities.) By this view the term "network peripheral" (however common) is a misnomer: a printer on a network is more accurately called a print server. A peripheral may be controlled via an addressable bus or a dedicated I/O channel, but it will always be in an environment that is under the strict control of the I/O subsystem of the operating system for the host. A host does not rely upon an intervening network to control its peripherals.

To continue in this vein just a bit further, consider if the file server on a network is a peripheral. Typically, it consists of a CPU and a disc farm. The CPU runs a space manager (file system) that has a network front end. The discs themselves are peripherals to the server-CPU; but they are not peripherals to any of the users' peers on the network! It will become clear that all of the problems that will be discussed at length below concerning data compression and "awkward" data storage paradigms apply to the network file server's space manager and its disc farm. How can a disc that does not store data in compressed form be replaced by one that does, without altering the space manager in either the server or the client? How could a magnetic drive be replaced with an optical one?

Troublesome Space Management Issues For File Systems

New issues have begun to emerge, however, that continue to have an impact on operating systems, file systems and the mass storage peripherals whose storage space they manage.

One of these issues is the development of other peripheral mass storage media that are best managed by a file system different from some existing file system used by the operating system. Examples of this include optical mass storage media and remote file systems under the direct control of a another system but accessible by a local area network (LAN) or by a wide area network (WAN). An issue that attaches to both these examples is the desire to avoid the introduction of different paradigms for file system control. That is, it would be undesirable for the user to: have to invoke one file manager to do something in one file system and a second file manager to do something in another; have to learn different conventions for the different file systems; and then have to resort to an altogether separate utility program to, say, copy a file from the first file system to the second file system because those two systems do not know how to talk to each other and exchange files directly. Instead, it would be much more desirable if different file systems developed at different times, or that manage information on quite different types of media, could be invoked by a common command set located in the operating system. A similar issue that attaches to the second example (accessing remote file systems via networks) is finding a graceful way to let the local file system invoke the distant file system such that the distant file system does most of the work (micro-managing a remote mass storage device over a network does not seem to be a good use of network bandwidth . . . ) and yet appears to belong to the same family of file systems hosted by the local operating system.

An increasingly popular solution to these issues is the notion of a virtual file system (VFS). The VFS solution amounts to a standardized protocol for describing generalized file system operations. As such, it can function as an interface between a common command set ("system calls") on the operating system side and specific features arising from the dissimilar natures or implementations of particular file systems on the other. A VFS includes VFS operations upon certain entities. After the fashion of the UNIX file system, these entities are nodes called "vnodes" (vnode stands for "virtual node"). The UNIX file system itself has been modified to become a VFS. By replacing the inodes of the UNIX file system with vnodes (together with making a few minor changes in addition) a powerful and well thought out file system control mechanism can be harnessed to a number of significantly different file system implementations, with the result that all the different file systems become subsystems that appear to coexist as part of the same overall system. For more information concerning vnodes the reader is referred to an article by a developer of the concept: *Vnodes: An Architecture for Multiple File System Types in Sun UNIX,* by S. R. Kleiman, published in 1986 the USENIX Association, El Cerrito, Calif., and appearing as pages 238–247 in a publication entitled *USENIX Association Summer Conference Proceedings.* That article has INSPEC abstract Number C87003315, and is hereby incorporated herein by reference.

Data Compression

Data compression has an impact on the architecture of the file system. Although the compression of a stream of data is, in the abstract, relatively easy to do (merchant IC's for this purpose are on the market, and several proprietary ones are in use as well), satisfactory integration of data compression into a random access mass storage file system requires some sophistication. A central problem is to ensure that there is effective management of the space that is freed by the compression. Conventional wisdom says that a file should be compressed before it is given to the operating system's existing file system to store on the disc. That way, the file system itself gets to manage the "extra space," since it already manages whatever space is unused. Since that file system is in the operating system, this means the data compression mechanism ought to be part of, be at the level of, or be executed by, the host CPU. But this is tantamount to having to design it into the operating system, as would be done for a major revision. Worse yet, since compression performed by software is slow and the fastest data compression is done with hardware dedicated to that purpose, locating high performance data compression in the CPU would require change to both the CPU and the operating system.

A compromise solution has been offered for personal computers. There are various products on the market that consist of hardware that is installed in an expansion slot in a PC and of some accompanying software. An installation process alters I/O arrangements created by the operating system, and redirects traffic to the disc through the extra hardware. In one such system special file operations (i.e., ones not provided by the operating system) must be used. This approach has the advantage of allowing an unfettered approach to space management, but suffers from a lack of transparency. Another approach uses the existing file system but intervenes in its internal bookkeeping for the space management process by adding a mapping that is functionally another layer of space management. Both approaches are subject to anomalous behavior under certain circumstances, and both add some additional processing overhead for the CPU.

It would be desirable if the benefits of data compression for peripheral mass storage could be brought to existing operating systems with only a minor upgrade, and with no changes at all to the hardware of the CPU. The file system would appear to operate in its usual manner, except that the disc simply appears to have an increased capacity. In other words, one would like data compression added to an existing mass storage subsystem to be transparent.

There exists the possibility of simply putting the compression mechanism in the peripheral (while leaving the space management mechanism in the operating system). In principle, this would seem to allow putting five or six scoops worth of (uncompressed) information into a three-scoop container, and with only a modest modification to the file system. The file system would have to be modified to the extent that it either accurately predicts the size of the compressed file, or receives actual size information from the compressing peripheral after the fact.

However, there is no fool-proof way for a file system located in the operating system to accurately predict the compression ratios that will result for any given file to be stored. Furthermore, such tight coupling between the file system and the peripheral may impair performance or cause peculiar side effects. But without such predictability or coupling there is no way for the file manager to know how much space the compressed file will actually take, so that the "extra space" that is left unused can then be managed by the file system as available extra free space usable for the storage of additional files. In other words, if data compression is to be located in a (random access) peripheral mass storage unit, then a space management process located in the operating system is in the wrong place!

Magnetic tape, on the other hand, does not have this problem with putting data compression into the drive, since: (a) files are not broken into small pieces spread out across the tape and physically interleaved amongst pieces of other files; and (2) the space management process is a simple serial consumption of the remaining available tape. It may be true that the using application program may fail to correctly estimate either: (a) the compression ratio for a particular file or (b) the amount of tape remaining. Such a failure may result in an inability to complete an attempted storage operation. However, this situation still arises even without compression, since the amount of tape remaining is truly just an estimate, anyway. The point here is that the serial consumption space management scheme used in tape drives continues to work as well with compression as it does without it. That is, the extra space afforded by compression is automatically "recovered" and put to use storing additional information. How to achieve a comparable result with data compression located "in" a random access mass storage peripheral that stores a file as a linked list of arbitrarily distributed clusters is indeed a formidable problem.

The notion of "granularity" can help shed some additional light on some of these issues. Any technique of data compression tends to have dynamics unique to itself. It is common for an adaptive technique to restart the adaptation process when, owing to a change in the nature or composition of the data, the compression ratio falls below a certain level. Thus, some structural features attach themselves to the compressed data. For example, a file may compress into several chunks, which may vary considerably in size, and it may be worth keeping track of what chunks contain what parts of the original file. On the other hand, the file system already has a selected amount of storage that it consumes as the fundamental unit of available space: i.e., the cluster or extent, which is one or more (generally more) sectors. The space management process in the file system operates on these fundamental units, or extents.

If a file is compressed in isolation before it is given to the file system, then the complete file must be stored and retrieved by the file system as a unit operation, since any original structure in the file has been concealed by the data compression. Even indexing information created by the compression process about, say, which chunk of compressed data contains such and such a record (or bytes m through n), will be unusable by the file system since it is not set up to take advantage of it. And even if it were, the compressed chunks and the fundamental unit of mass storage generally won't line up on common boundaries. (Except perhaps for magnetic tape, where there need not be a fixed size fundamental unit of storage.)

If the file is compressed either as a data stream on its way to the mass storage peripheral, or by the peripheral itself, with no coupling back to the space management process, then the file system has a false understanding of where things are and of how much space was used, and remapping or other intervention is necessary, as mentioned earlier. Furthermore, the compression process also has to make some choices concerning consumption of fundamental units of storage space versus where the boundaries of the compressed chunks occur.

A solution to these problems is as follows: Suppose that a data compression mechanism is to be located "in" a random access mass storage peripheral, so that the existing operating system and its file manager can be left unaltered (or at least largely so). Then, give the random access mass storage peripheral its own data compressing file system. This allows the file system in that peripheral to manage all available space, and for that space to simply appear bigger in accordance with the degree of compression achieved.

Upon reflection, however, at least two issues arise. First, that peripheral's file system needs to be one that is compatible with the file operations possible in the host file system. If the user calls up a file, appends a big chunk onto it, and then stores it back, the peripheral file system needs to support this, no matter what, right up to the point where the disc is full. Or, if the relocation of subdirectories or the mounting of other file systems is permitted in the host file system, those operations must be supported by the peripheral file system. Second, a way must be found for operations originally accomplished by the host file system to be sent to and automatically performed instead by the peripheral file system.

The first issue above is solved by incorporating into the peripheral a suitable hierarchial file system. "Suitable" ranges from "identical" to "equivalence through adequacy." That is to say, the peripheral could probably have any of a number of different internal file systems, and need not have any particular one, provided that what can be done in the original file system can be mirrored in the peripheral's file system. The second issue can be resolved by taking advantage of a VFS that understands that the peripheral's file system is simply an additional target file system, and by providing a suitable way to get the VFS operation codes to the peripheral's file system (i.e., a certain kind of driver is needed).

As will become clear, these solutions can be realized in several different physical arrangements. As a first step, the additional elements of compression and file management can be bundled together into a resource that is VFS on the CPU side and disc hardware command set on the other. The different physical arrangements concern where this new resource is located. On the one hand, the random access mass storage peripheral itself can be designed to include, as a complete product, the additional element of a data compressing file system. On the other hand, the mass storage peripheral could be any conventional such peripheral, and the additional resources fabricated as a box with CPU-side and disc-side connectors on it. Such an embodiment amounts conceptually to a "lump in the interface cable" between the CPU/host and the peripheral. Now consider squeezing the lump away from the peripheral and toward the host; it could as well reside in the I/O card cage of the host computer.

Having a "lump" separate from the peripheral it controls has certain advantages. For one, it allows the data compressing file system to be quite general purpose. Let it have a SCSI interface receptive to VFS on the host side, and a SCSI interface on the peripheral side from which issue instructions in the hardware command set of the peripheral. Inside, the "lump" includes knowledge of all different peripherals of interest, and EPROM for the downloading of code for new ones that come along later. This becomes a very powerful way to make any disc simply look bigger or run faster, even if it is already in use. All that a user would need to do for a disc already in use would be copy the uncompressed files on the disc to intermediate files in a level of hierarchy above the "lump" and then rewrite them as compressed files. It is also quite possible to equip the file system in the lump with a Compress File command whose argument is a file on the disc managed by the lump. Such a command reads the file as if it were incoming data from the host computer, compresses it, writes it back to the disc, and then discards the original file.

Autochangers

An autochanger includes an array of physical storage locations (as if parking spaces in a garage) for discs. One or more disc drives are available to mount discs retrieved from the garage. A picking mechanism operating between the garage and the drives puts and gets discs. The central fact that an autochanger provides mind-boggling amounts of storage capacity is tempered by the long delay required to access information on an unselected medium (disc), and also by the need to keep track of which disc is loaded in which drive.

Locating a file system in a peripheral mass storage system that includes an autochanger can significantly improve the performance of that mass storage system, particularly if it maintains its own cache of mass storage, such as a magnetic hard disc drive (e.g., a "winchester"). The principal reason for this improvement is that the space management process can have detailed knowledge of the actual storage mechanism, and can make informed decisions. Lest this sound trite, remember that the conventional file system doesn't know anything about autochangers or pickers. It doesn't know that only one or a few discs are on line; it thinks that they all are. A simple copy operation could cause extensive thrashing of the picker.

Proper caching can ease this problem. However, it is not as simple as merely putting a conventional data caching mechanism in the autochanger. Such a move would cache data identified by its volume, track and sector description. While potentially helpful, such caching is less than ideal.

To see why, consider that many file systems distribute their "meta data" throughout the medium whose space they are managing. Meta data is the tabular or linked list information about which files are on the medium and what the linkages are between the various extents (pieces) of those files. The idea is that this proximity of physical locality can cut down on the distances traversed during seeks for head positioning, and thereby speed things up. It works, too, provided that all the discs are on line! Accessing meta data happens a lot, and the need to visit a surface (for meta data) on the way to a file located on a another surface can produce unacceptable performance in an environment including an autochanger. It is not so much that a volume-track-sector cache excludes meta data, it is more that all the meta data needs to always be in the cache ahead of time. It has to be this way, since the performance penalty for accessing an unloaded surface is so severe. The temptation of merely making the cache an enormous magnetic disc and then caching entire files or extents as indivisible objects at that level of abstraction is to be avoided. In and of itself such "high level" caching is not a bad idea, but it does not solve the problem of the performance hits incurred during the initial traversing needed to access those entities in the first instance. (Remember, whether the data is in the cache or out on a surface in the autochanger, it still has to be traversed. Track-sector caching traverses just as well, and may give the cache a finer granularity that lets it "hold more".)

It is clear, then, that autochangers call for special treatment by their associated file systems. This could include locating a transparent peripheral file system within the autochanger, and equipping that transparent peripheral file system with a cache that stores all the meta data for information kept on the discs served by the autochanger. Preferably: no meta data would be kept on the discs served by the autochanger (regardless of what kind of file system is associated therewith), and it would be put on such a disc only if it was prepared for export from the autochanger to another environment; and, the cache would be a winchester disc.

A transparent peripheral file system located with the autochanger is an ideal mechanism for maintaining and exploiting a complete collection of meta data for the files on the discs served by the autochanger.

Further advantages arise when an autochanger has its own file system. If desired, the autochanger's file system can make time saving choices about where to write things (e.g., to select an already mounted disc unless specifically instructed otherwise). After all, it is a file system task to keep track of where things are, and unlike its host counterpart, an autochanger's file system can be written to specifically understand about a garage full of discs with not enough drives to mount them all at once. Once there is a file system in the autochanger all the favorable aspects of data compression discussed earlier now apply, as well.

Separate Erasure Media

Some mass storage media (such as magneto-optic) require a separate erase pass prior to a write operation. This has the undesirable effect of making write operations in need of pre-erasure take longer than read operations. An improvement in performance for this class of mass storage could be realized if the penalty of the separate erase pass could be avoided. One way to do this is to pre-erase portions of the medium that were once written to, but that are now part of an inactive file (say, that file was killed/purged/erased). Garbage collection can determine which portions of the medium are ripe for pre-erasure, after which time the pre-erased portions can be added to a ready-to-write free list of space on the medium available for immediate one-pass write operations. The idea is to do the garbage collection and pre-erasure during times while the drive would otherwise be idle.

Only the space management process (i.e., the file system) knows for sure where the collectable garbage is, and it is already the keeper of a list of unused free space. So it makes good sense to locate a garbage collecting pre-erasure process under the control of the file system. However, it is not necessarily a good idea to have that process reside at the operating system level of a host. Suppose the peripheral (or some improved version of it) came along after the present version of the operating system? Instead, it is better if such a peripheral mass storage device (one that needs a separate erase pass) had its own file system and its own garbage collection and pre-erasure process. That way, the operating system doesn't really need to know the details of the peripheral at all, and that peripheral mass storage device just appears to run as fast as it would run if it didn't have to separately erase.

WORM Drives

WORM drives are those that allow read and write operations but not the overwriting of previously written material. This produces an inability to append new material anywhere except at physically unused portions of the medium, which is fundamentally at odds with how a file system normally expects to operate. A central advantage of the distributed cluster architecture of the modern hierarchial file system is the reclamation of previously used clusters that are now free, so as to avoid the periodic need to repack the disc to eliminate "fragmentation". But a WORM system constrains things that are written, whether new or amendments of the old, to go into an ever diminishing pool of the yet unused: the main crankshaft of reclamation must be replaced if the medium is WORM.

There are three conventional ways to cope with WORM medium. This first of these is to emulate magnetic tape. In one sense this is a reasonable solution, as it forces the logical organization of information to be constrained by its ultimate physical realization on the WORM medium: "You send your stuff serially and we'll write it that same way." It's fast and it's simple. It's also a good choice, unless the information is already organized at the sector level by some cluster distributing file system that the WORM drive is to be a part of! What's at work here is the difference between a serial write or read when a serial peripheral like a tape drive is at one end of the transaction and the file system (with its disc) is at the other, and the altogether different situation of making the file system manage the space on the tape as if it were part of the disc. So, the solution of using a WORM drive as if it were a tape drive is to treat the WORM drive as strictly a peripheral device outside the control of the space manager/ file system.

Another solution for the use of WORM drives is to construct a separate non-transparent file system (or a collection of dedicated utilities) that has been adapted to the nature of the WORM drive. This approach solves many of the problems, but at the rather high expense of splitting the totality of file oriented operations into separate user interfaces.

Still another solution has been the mapping of the sector structure for the file system's space manager into an appropriate collection of WORM addresses. The mapper is part of the WORM environment (either in the interface or the drive proper) so that the file system can treat the WORM drive just as it would any regular drive. What the mapper does is maintain a table of correspondence between locations in a rewritable space managed by the file system's space manager and the locations in the WORM medium. Each time a location in the rewritable space is written to it is remapped into the next available never-yet-written-to location in the WORM medium. Things not yet written cannot, of course, be read. But once they are written, or rewritten, they are ordinarily read from the location specified by the mapper. (If an audit trail or history is desired the rules for constructing the mapper can be invoked along with an inspection of what is actually written on the early locations of the WORM medium.)

With a mapper the WORM drive is truly part of the file system, and subject to the "control" (albeit indirectly) of the space manager. But this "compatibility" is obtained at the expense of occasionally producing some bizarre results.

Consider the superblock. This is a very important piece of stuff, as without it all that has been written to its file system is as good as lost. A file system for a magnetic disc or a CD ROM may maintain several physically separated copies of the superblock: one on an inner track, one on an outer track, and several on tracks inbetween. The idea is to provide redundancy in case some local defect develops that ruins one of the copies. Suppose there are five copies. During the operation that builds a file system, the WORM mapper simply sees the five copies in a sequence of one after the other, and thus writes them as physically sequential items. So much for the robust survivability of the file system in the event of some disaster!

Another gotcha is the operation of an optimizer that attempts to store in physically contiguous sectors those items that are logically adjacent within a file structure. But the mapped results likely won't have any rational bearing on improving WORM performance; the mapper makes physically adjacent those elements of a file that occur adjacent in a train (sequence) of write operations, which has no necessary bearing on their being logically adjacent in the overall structure of the file. It is very possible in a WORM environment for an optimizer to actually make things worse than if it were not used at all!

And finally, there arises with a mapper the general issue that there are now two space management processes which do not necessarily cooperate. Suppose, for example that the WORM drive gets full, and can no longer write. If the file system in the host is in the middle of trying to write a file that would otherwise fit if the medium were rewritable, all that can arise is a situation equivalent to a fatal hardware write error. It would be desirable if a WORM-conscious file system could realize ahead of time that the attempted operation won't fit, and gracefully decline to accept the task so that the user can exercise any available options for recovery.

The performance of a WORM drive integrated into a file system can be improved, and the above difficulties avoided, by giving the WORM drive its own space manager/file system. Then the user of the host file system gets to treat the WORM drive just as any other drive managed by that file system, but the information gets stored on the WORM drive in a way that avoids the irrational.

Transparent Peripheral File Systems

We shall term the type of solution that has been described above a "transparent peripheral file system". It is transparent because, once installed, the commands within the native file system of the operating system are used without being augmented by additional commands. It is a peripheral file system, since: (a) no intervening network nor server is required to place it into service; (b) it is responsive solely to the host via a host I/O channel managed by the host operating system; and, (c) no other hosts have such access/ control to the peripheral file system. It is a file system because the traffic that goes over the I/O channel is a combination of file system commands, status information and file data. Track/sector level hardware commands to a mass storage mechanism are not part of the traffic.

These characteristics belong to each of the three configurations introduced above. These are the mass storage peripheral including an embedded peripheral file system, the "lump in the cable" cooperating with conventional mass storage peripherals, and "smart" interface card. It is to be remembered, of course, that each of the three configurations includes a "peripheral file system adapter". (That is the virtual file system spigot added to the host firmware/software which couples the peripheral file system to the host's file system as a remote file system.)

Peripheral vs. Networked File Systems

While keeping the foregoing litany of problems in mind, consider the difference between: (a) Simply taking one of the drives in the disc farm of a network file server and putting it in the same box as the server/CPU and saying "Aha, here is a transparent peripheral file system"; and (b) Equipping the server with an adapter to allow it to delegate portions of the space management task to the corresponding drives in the disc farm which each have their own space manager. As to (a), while it might be done for one drive in the farm, what about the others? How are they to be controlled? If the same thing were done for them it would amount to adding additional servers. But then who is the "head server" in charge of overall space management? The idea breaks down until it is recognized that the server is essential and that it has peripherals.

What the network needs is a server that acts as a central clearing house for the putting and getting of files. How the server divides up the task of space management between itself and its peripherals need not be of any particular concern to a peer out on the network. What we are saying here is that a file server might (as in case (b)) avail itself of transparent peripheral file systems within its own territory, so to speak, as a strategy for accomplishing its function as a file server. The peers out on the network that are the clients would never know the difference. That is because the file server still exists and is an intervening agent between the peers on the network and the peripherals of the file server.

As to (b), then, we see that the self-space-managing disc drives (transparent peripheral file systems) of the disc farm are indeed peripherals of the server/CPU, but are neither servers in their own right nor peripherals of any peers on the network. Peers could have their own self-space-managing disc drives, however, which would be their peripherals.

Once again, we see that there is a fundamental difference between a peripheral file system and a networked file system. A peripheral file system uses a space manager that is closely coupled to the media it manages and that is in a direct and exclusive peripheral relationship with its host, without an intervening network and the associated activities of a server.

Future Unknown Peripheral Mass Storage

Who can say what unusual aspects or particular requirements may be attached to future peripheral mass storage technologies. If past developments are any guide, it is likely that they will not realize their full potential if their space must be managed by an existing space management process developed without such new aspects or requirements in mind. The techniques outlined above allow the existing file system to transparently receive as an installable extension thereto a space management process that is specially tailored to the new technique.

While we can't guess the future, we can illustrate the flexibility of the described technique by showing how it works with an old idea not presently in widespread use (in PC's and workstations, anyway). The idea is "bit files" and "name servers" and involves a different division of labor and organizational strategy than the regular hierarchial file systems in widespread PC and workstation use today.

The basic concept is for directory information to be kept in one (logical) place (say, on a disc reserved for that purpose) as a directory of names, and for all data to be stored elsewhere (or in an altogether different portion of the same disc). That is, no data is actually stored in the same location as or amongst the name directory information. The name directory contains only location information about where each file is stored, although it is also optimized to support inquiries about what files or parts of files are stored on a given medium (for ease in back-up or in draining information from a troublesome unit so it can be replaced). The data of the files referred to in the name directory are just so many bits (hence the name "bit files"). Those files can be implemented any way that suits the storage medium in use. (An early use of this idea is believed to have been writing and reading of dots for bits on microfilm.) That is, the bit files themselves could be hierarchial files that have their own private indexes (tables, maps or other data structures) telling (the bit file server) how to traverse the file. Then the entry in the name directory points to the location in the bit file where the traverse begins. The name server does not perform the traverse; that is the job of the bit file server.

Clearly the bit file peripheral is an environment where an internal space manager can be adjusted to provide compression or any other special file storage paradigm. To implement the name server into an existing file system that didn't already know about it, the vnode techniques for remote file access, or their equivalent, would be needed. It is clear that the bit file peripheral could be one that has its own internally implemented file system and that is responsive to vnode talk, as is described herein. Once that is done the bit file server, as a separate entity, disappears. What would remain would be a transparent bit-file-system peripheral usable as a peripheral of the name server.

SUMMARY OF THE INVENTION

Certain random access mass storage peripherals are more useful when they operate under the aegis of a separate file system or space manager associated with that peripheral and implemented by hardware distinct from the host CPU. Such a separate file system is referred to herein as a transparent peripheral file system (TPFS), and is a microprocessor based control system which receives file oriented commands from a host and subsequently: (a) issues a suitable sequence of commands to the peripheral; and (b) sends or receives data associated with the file oriented commands. The TPFS (transparent peripheral file system) thus makes the peripheral appear to the host as if contains its own file system, which in a logical sense it does. In a physical sense the peripheral may or may not contain the hardware of the TPFS. That hardware may be located in the peripheral, may be separate hardware between a conventional peripheral and the host, or, may be an I/O card slot in the host.

To avoid the introduction of multiple file system command sets at the user interface, a peripheral file system adapter (PFSA) is easily added to the host's operating system if that operating system is already equipped with a virtual file system (VFS) and a vnode interface (or equipped with the equivalent of VFS and vnodes). The PFSA connects at the vnode interface level and incorporates the TPFS into the VFS.

Since it is closely associated with the peripheral whose space it manages, the TPFS can include enhancements to file system operation that are specific to that particular type of peripheral, but that are absent from or difficult to incorporate into the host's file system. Thus, data compression incorporated into a TPFS is truly transparent at the user's level, and simply makes the medium appear larger, and perhaps even faster. The TPFS can intelligently manage an autochanger and provide caching of files by incorporating a hard disc. The TPFS can provide as a background activity garbage collection and pre-erasure for media that require separate erase and write passes. This effectively results in a one pass write operation, which is an increase in performance. A TPFS can provide a space manager for WORM drives that avoids the irrationalities that arise when a WORM medium is managed by a mapper driven by an ordinary file system. In similar fashion, a TPFS can take care of future mass storage peripherals having unusual and presently unknown space management aspects or requirements. To be sure, that TPFS will require a new space manager, but that can be provided, either as replacement or plug-in ROM's or as downloadable code if the TPFS is a "lump" in the interface bus cable or a "smart" I/O card, or possibly as resident code if the TPFS is actually built into the peripheral. Either way that TPFS is simply mounted into a virtual file system above it through a peripheral file system adapter.

Each TPFS is itself a virtual file system: multiple file systems can reside within it, and it also incorporates within itself the attributes of a PFSA. Accordingly, a series of TPFS's may be cascaded, or stacked, resulting in a physical analog of how their respective file systems are mounted to each other.

A Character To File Translator (CFX) allows a TPFS to emulate raw mode access, even if the host system is not equipped with a vnode file operation interface. CFX does this by converting to and from streams of characters communicated with an application using this ersatz raw mode, while instead of storing the data on the storage medium itself, actually relying upon the remote peripheral file system for storing, or having stored, the streams of characters as a file.

DESCRIPTION OF A PREFERRED EMBODIMENT

Transparent Peripheral File System (TPFS)

Figure 1:
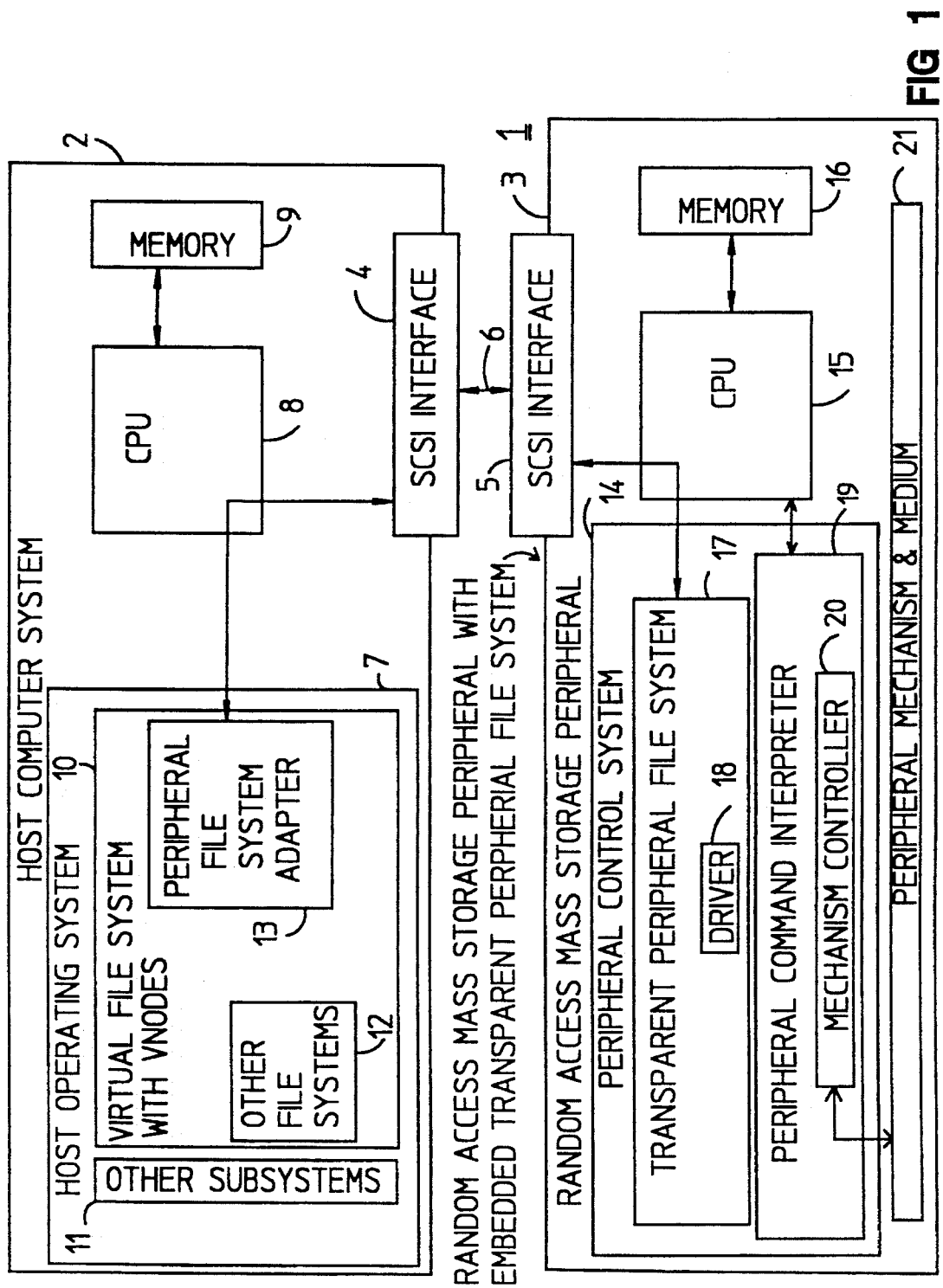
FIG. 1 is a block diagram of software and hardware elements in a first realization of a preferred embodiment for a remote peripheral file system.

Refer now to FIG. 1, wherein is shown a block diagram 1 of an arrangement 1 of software and hardware elements allowing an operating system to utilize a random access mass storage peripheral having a self-contained transparent peripheral file system (TPFS). According to FIG. 1 a user of, or a program running upon, a host computer system 2 can specify file operations to be performed by a random access mass storage peripheral 3. An interface 4 in the host computer system 2 and an interface 5 in the random access mass storage peripheral 3 are interconnected by an interface cable 6. In the present embodiment those interfaces 4 and 5 are SCSI (Small Computer System Interface), although the actual interface is largely a matter of choice. Any of the more robust interface schemes are applicable, just so long as they are otherwise suitable for use with a random access mass storage peripheral, and that strings of (high level, or file operation oriented) commands and data are expressible as corresponding strings of characters in some character set used by the interface. For example, the interfaces 4 and 5 could also be IEEE 488.

The host computer system 2 may comprise any of a wide variety of computers, including but not limited to, personal computers (whether of the desktop or laptop variety), workstations, servers, mini-computers, mainframes, mini-super computers and super computers. And while the arrangement 1 in FIG. 1 depicts only computer system 2 and peripheral 3, it is to be understood that those two items need not be the only ones present. There may be other peripherals, and the computer system 2 may be a part of a larger network comprising other computers, as well. In this connection, it should be pointed out that the term "host" in "host computer system 2" is somewhat relative. We use the term here to denote a host-to-peripheral relationship, in the sense that the host computer system 2 is the immediate originator of tasks for random access mass storage peripheral 3. Our use of the term "host" is not meant to describe a relationship between computer system 2 and some other computer in a network of which they are both a part.

The host computer system 2 includes a host operating system 7, which is, of course, code that executes upon a CPU 8 operating in conjunction with associated memory 9, and possibly with another disc drive (not shown) from which the host operating system 7 is booted and upon which the various non-resident portions of the host operating system 7 are swapped into memory 9 as needed during execution. However, by use of a suitable boot program in memory 9, the host operating system 7 could as easily be booted and executed from random access mass storage peripheral 3.

Host operating system 7 can, for example, comprise the UNIX brand operating system (UNIX is a registered trademark of AT&T Corp.), any of its look-alikes, or the MS-DOS brand operating system (MS-DOS is a registered trademark of Microsoft Corp.). Host operating system 7 further comprises a virtual file system 10 and various other subsystems 11. By the term "virtual file system" we mean: (a) There is a single file system interface via "system calls" for some using entity. (That entity could be either a program using the system calls directly or an actual person using a shell to convert still higher level commands to corresponding sequences of system calls.); (b) That the file system interface can cause activity in separate disparate actual file systems through the use of a single command set / control paradigm at the user level; and (c) That the commands of the single command set are translated by the virtual file system into corresponding sequences of commands in a general purpose generic file operation description language to which the separate actual file systems are each responsive. An example would be a UNIX system that has had the inode layer replaced by vnodes to implement NFS (Networked File System).

The virtual file system 10 comprises one or more various local target file systems 12 responsive to the general purpose generic file operation description language (vnode talk). Also responsive to the general purpose generic file operation description language is a peripheral file system adapter 13. The peripheral file system adapter 13 is a piece of software that is installed into the virtual file system 10 as if it were another local target file system; however, it is not itself a complete file system. Instead, the peripheral file system adapter communicates with the virtual file system 10 by means of the general purpose generic file operation description language just as if it were an actual file system, by: (a) packaging outgoing traffic from virtual file system 10 for transmission over the interface 4 to peripheral 3; and (b) forwarding return transmissions from the peripheral 3 as incoming traffic to the virtual file system 10. That is, the peripheral file system adapter 13 plays the role of a remote communications port for an actual file system located and executed elsewhere. In the case of FIG. 1 that somewhere else is the random access mass storage peripheral 3.

Located within random access mass storage peripheral 3 is a peripheral control system 14 implemented in firmware located in a memory 16 and executed by a CPU 15. Peripheral control system 14 comprises a remote peripheral file system 17 and a peripheral command interpreter 19. Functionally, remote peripheral file system 17 is coupled to interface 5 for the communication of traffic with the peripheral file system adapter 13; in a logical sense the remote peripheral file system 17 is the recipient of file operations issued by the peripheral file system adapter 13.

The remote peripheral file system 17 converts the vnode-style file operation commands (and their associated streams of data) into appropriate sequences of drive mechanism oriented commands drawn from a (hardware) command set implemented by the internal machinery that is the real guts of the random access mass storage peripheral 3. This conversion is tailored for the specific hardware command set and drive parameters in force (e.g., size parameters—two drives might have the same basic command set but differ in the number of surfaces available) with the assistance of a collection of drivers 18. These drivers 18 also assist in the formatting of data coming from the mechanism into collections reflecting the file level of organization with which they were originally stored.

In accordance with those ends, the drivers 18 are functionally coupled to a peripheral command interpreter 19. Typically, interpreter 19 is also implemented in firmware, and it oversees the actual conversion between the programmatically (and digitally) conveyed/expressed commands or data and the actual analog signals that eventually inhabit the tangible peripheral mechanism. To this end the peripheral command interpreter 19 is typically assisted by a mechanism controller 20, which amounts to a fairly extensive chunk of circuitry. It is here that are found controllers for stepper motors and linear motors, etc. The mechanism controller 20 is electrically coupled to the actual peripheral mechanism (drive motors, heads, amplifiers, sensors, etc.) and its medium (or media) 21.

As FIG. 1 is drawn it shows that the code of the peripheral command interpreter 19 is executed by the same CPU 15 as executes the code for the remote peripheral file system 17. This architecture is further reinforced by showing the peripheral control system (which has some code of its own, too) as the outer level containing both the file system 17 and the command interpreter 19. This architecture may be suitable for many, if not all, applications, provided that the CPU 15 is fast enough to respond to all the various asynchronous hardware level events (interrupts from the interface 5 and from the mechanism controller 20) without degrading performance.

An alternative arrangement exists, where each of the remote peripheral file system 17 and the peripheral command interpreter 19 are executed by their own associated CPU. In such a case the peripheral control system 14 might vanish. Suppose, for example, that the design of a preexisting disc drive is to be augmented by a "drop-in" remote peripheral file system inserted in the path between the interface and the command interpreter. Perhaps the power supplies might bear the extra load without danger, but it would probably be quite risky to disturb the existing CPU and its associated firmware implementation for the control of the peripheral by adding a major system as extensive as a file system. In such a case, or even where the goal was simultaneous development of very robust decoupled systems expected to have minimal defects and maximal reusability, the strategy of choice would be to employ separate processors for the file system 17 and the command interpreter 19.

The trade-offs presented by the two strategies are familiar, and are believed to be recognized (even if not always correctly appreciated by management!) by those who deal with such system level decisions.

Figure 2:
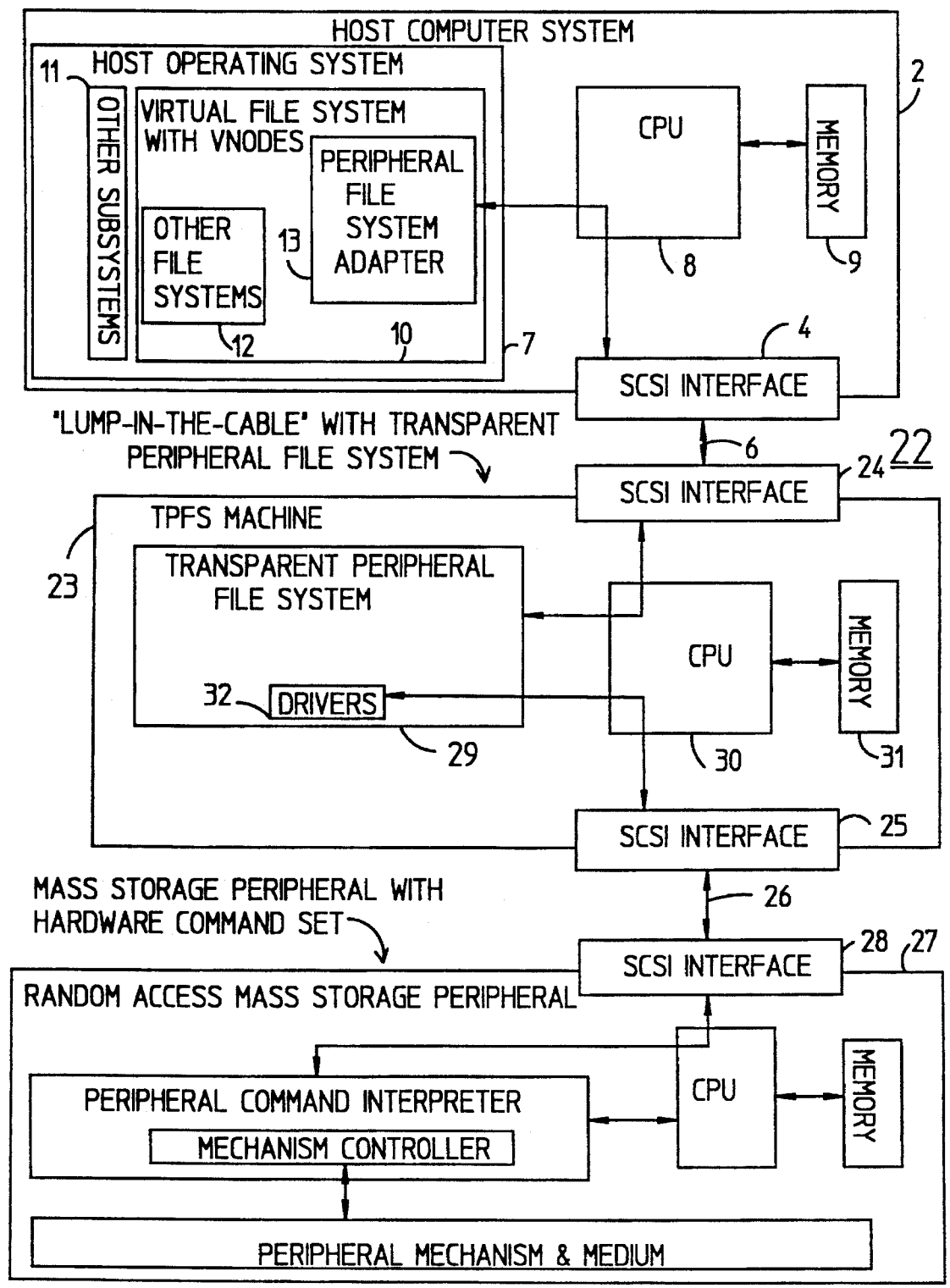
FIG. 2 is a block diagram of software and hardware elements in a second realization of a preferred embodiment for a remote peripheral file system.
Figure 3:
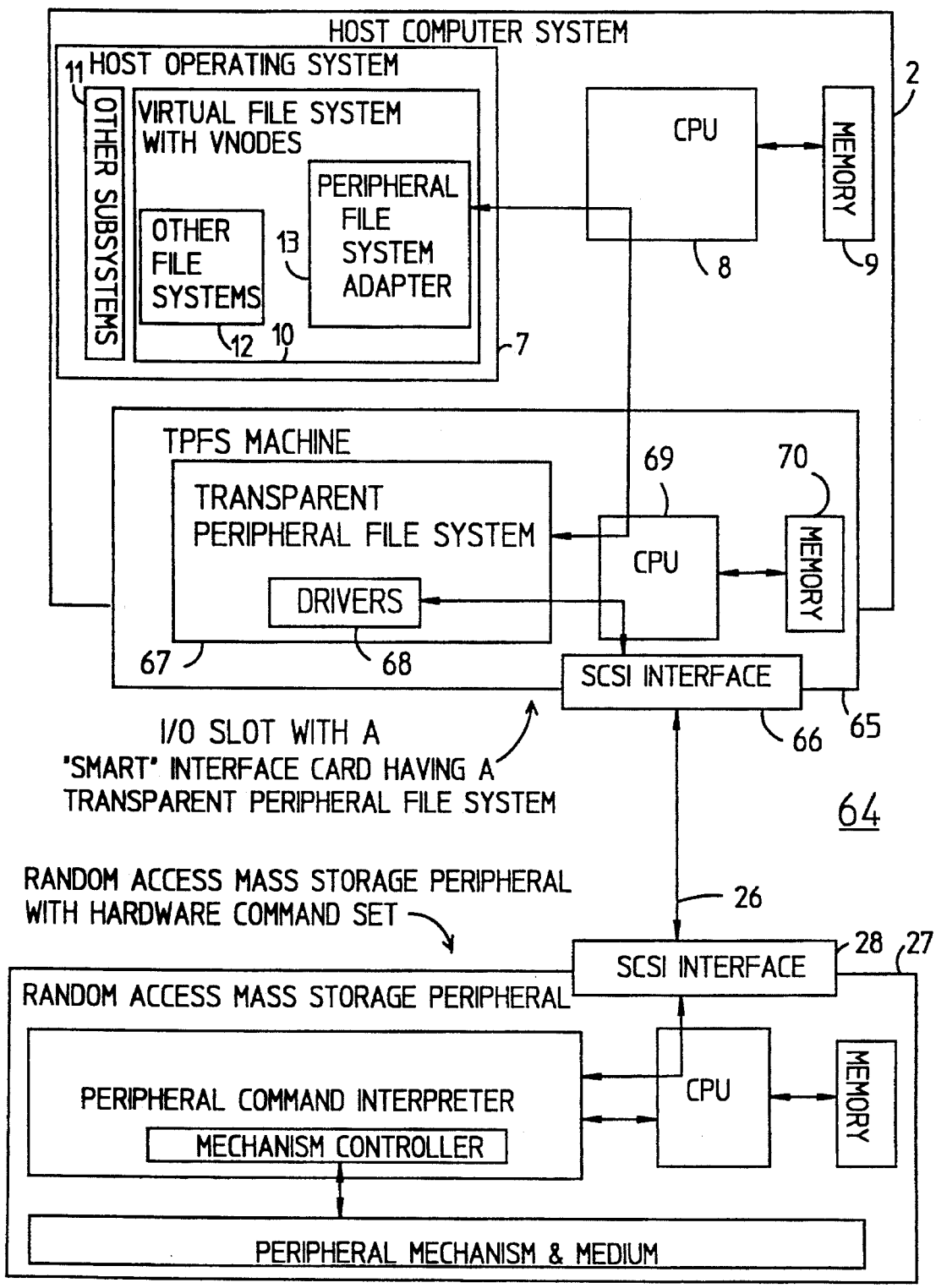
FIG. 3 is a block diagram of software and hardware elements in a third realization of a preferred embodiment for a remote peripheral file system.

Some further observations are in order before leaving FIG. 1. First, TPFS 17 is itself a virtual file system in its own right, and includes the attributes of a peripheral file system adapter, such as PFSA 13. The reasons for this will become clear in the discussion of FIGS. 4, 5 and 6 below, which is undertaken as a digression between the discussion of FIG. 2 and the discussion of FIG. 3. It should be further borne in mind that TPFS 17 may well be a multiple file system. Next, if data compression is to be used, it will appear as a subsystem within the remote peripheral file system 17. We have not discussed this, nor other enhancements of the remote peripheral file system, nor the use of a winchester cache, nor any of the details of the peripheral file system adapter 13. These various topics will be taken up in due course. However, our main purpose with FIGS. 1–3 is to introduce generally a collection of architectures that are basically similar. Once those are introduced, it will then be appropriate to visit the various component elements, such as the peripheral file system adapter 13 and remote peripheral file system 17, with far less concern about which topology (FIGS. 1–3) they are serving in. There will be some minor differences, to be sure, but by that point they will be easily appreciated.

Refer now to FIG. 2, wherein is shown a simplified hardware and software diagram 22 of a remote peripheral file system implemented as a "lump in the cable" 23 between a host computer system 2 and a random access mass storage peripheral 27. The host computer system 2 is the same as described in connection with FIG. 1, and has the same reference numbers for corresponding elements. The term "lump in the cable" is, of course, fanciful, and is meant to suggest that it is fairly small (say, about the size of a brick, or smaller) and that it is no more trouble to physically install than a length of cable. A technical term for the "lump" is "TPFS machine". In a preferred embodiment the TPFS machine 23 is more than a mere bulge in the cable covered by the outer sheath; it is a small box containing a chassis or printed circuit board and having "host side" and "peripheral side" connectors to which standard interface cables 6 and 26 are attached. It has its own power cord, too, unless it can receive power via one of the interface cables 6 or 26 (or is battery powered, which while possible, seems unlikely).

Interface cable 6 connects an interface 24 to the interface 4 of the host computer system 2; interface 24 is thus referred to as the host side interface of TPFS machine 23. In like fashion interface cable 26 connects an interface 25 to an interface 28 of the random access mass storage peripheral 27; interface 25 is thus referred to as the peripheral side interface. As with the case for FIG. 1, these various interfaces may be of any suitable type, with SCSI and IEEE 488 being at the present time the most prominent examples. Even though it is clear that it is inappropriate to refer to interfaces 24 and 25 as input and output interfaces, respectively, (because there is traffic in both directions on each), it seem fair to say that the flow of control is in the direction of from the host side 24 to the peripheral side 25.

The random access mass storage peripheral 27 may be an entirely conventional peripheral, or it may be of a type not yet known. The point is that no special modifications are required to it before it can be managed by the TPFS machine 23. It need only have a hardware command set and data transmission protocols that can be conveyed between interfaces 25 and 28 by cable 26.

It will be noted that the depicted internal structure of peripheral 27 is exactly that of peripheral 3 of FIG. 1, except that remote peripheral file system 17 and its drivers 18 have been "slid" back along the interface path toward host computer system 2, until they are between host 2 and peripheral 3. With TPFS 17 gone, the depicted peripheral control system 14 vanishes in favor of the peripheral command interpreter 19; peripheral control system 14 merely depicts whatever common environment might usefully contain both the TPFS 17 and the command interpreter 19, anyway. If the TPFS 17 is absent, any remaining useful properties of the control system 14 can be thought of as already having been put into the command interpreter.

The TPFS machine 23 comprises a remote peripheral file system 29, which in turn includes a collection of drivers 32. As with FIG. 1, those elements are executable code (either in ROM, or, in EPROM or RAM and that were downloaded from the host system 2) that are executed from a memory 31 by a CPU 30. Also as with FIG. 1, no detail concerning particular features, such as multiple file systems, data compression, caching with a small hard disc, or other special operational features of the TPFS that are tailored to the nature of the medium, are visible at the present level of abstraction. These aspects will be discussed further on below when these same issues are discussed for all of FIGS. 1, 2 and 3.

In many respects FIG. 2 is merely a rearrangement of FIG. 1, but in one important respect it does afford a significant capability not present in FIG. 1. To be sure, the block diagram 1 of FIG. 1 can be modified to include this additional capability, and how to do that will be mentioned in connection with FIG. 6. But for now, the most effective way to introduce this topic is to refer briefly to FIGS. 4 and 5.

Figure 4:
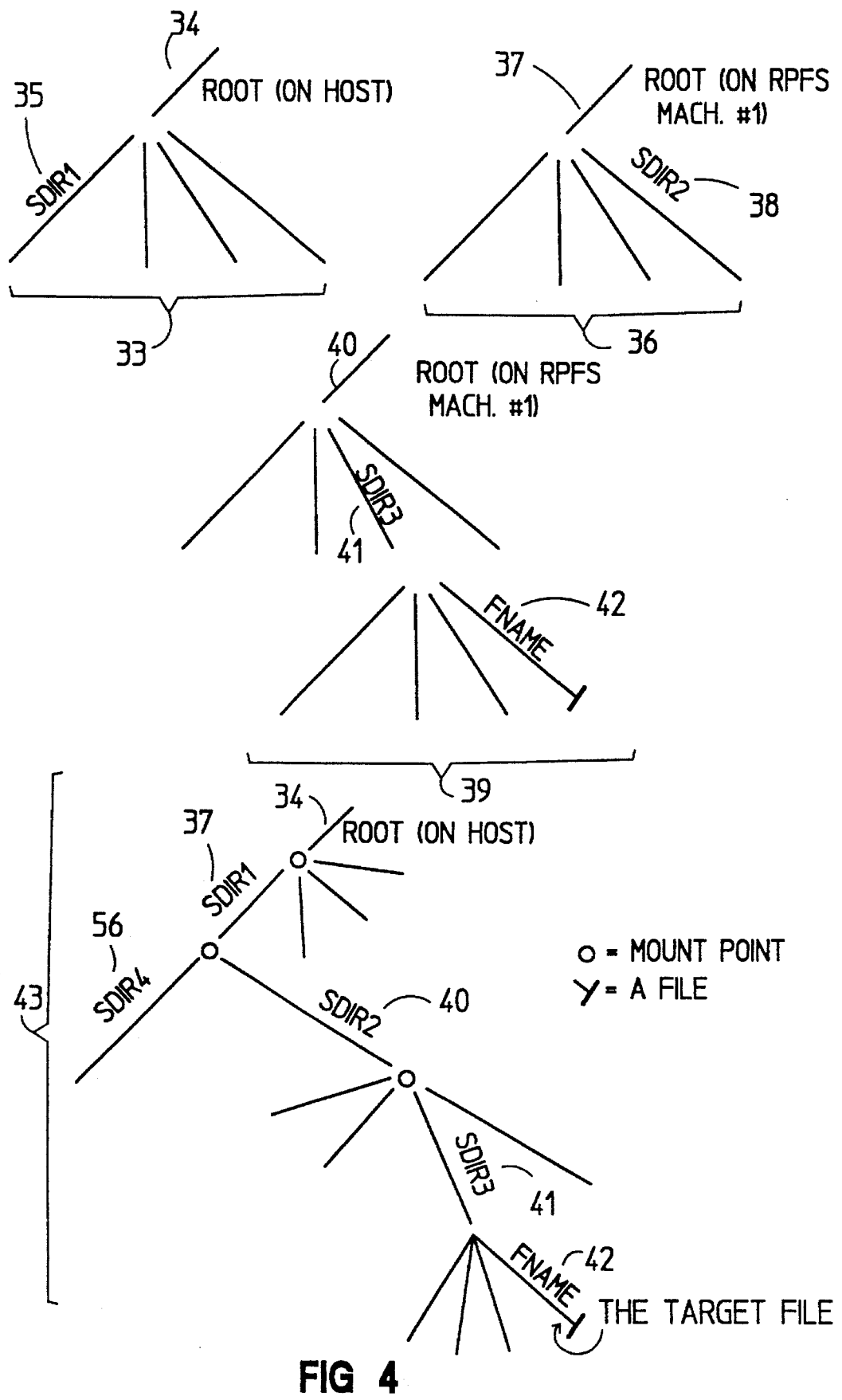
FIG. 4 is a structure diagram of three component hierarchial file systems and a resultant composite hierarchial file system created by the mounting of file systems onto one another.

FIG. 4 depicts three simple hierarchial file systems 33, 36 and 39 that are used as components to construct a more complex hierarchial file system 43. This is accomplished through the mechanism of mounting one file system onto another.

Consider file system 33. It is found on the host computer system 2, which is also equipped with a TPFS adapter 13. The file system 33, however, is (for this example) not within the boundary of any TPFS; instead, it is managed by the virtual file system 10 native to the host operating system 7. To this end, the root directory 34 of file system 33 is found on a specific disc (not shown) designated as the root disc. The root directory (ROOT 34) of file system 33 contains a subdirectory SDIR1 35.

In similar fashion, file system 36 is found on a disc (or other random access mass storage device) named TPFS#1_DISC#1. (Its location will be discussed in connection with FIG. 5.) It may be thought of as existing in isolation until mounted to another file system. It too has a root directory (ROOT 37), which in turn contains a subdirectory SDIR2 38. The remaining file system 39 is found on a disc named TPFS#2_DISC#1 (also located by FIG. 5). It has root directory ROOT 40, which contains subdirectory SDIR3 41, which in turn contains a (target) file 42 named FNAME.

Also shown in FIG. 4 is a resulting hierarchial file system 43 obtained by mounting file system 39 onto file system 36, and then mounting that result onto file system 33. Those familiar with file system technology will recognize that the subdirectory SDIR1 35 in file system 33 is "covered" with ROOT 37 of file system 36. The old SDIR1 35 still exists as whatever tracks and sectors it used to be, but is now inaccessible as a result of (temporary) changes to the descriptive data structures that the file system 33 uses to traverse itself. The data structures describing file system 33 indicate that ROOT 37 of file system 36 is to be treated as though it were SDIR1. This is why the SDIR1 in file system 43 is denoted with reference number 37 (it is the same as for ROOT in file system 36). In similar fashion, note that SDIR2 in file system 43 in denoted by reference number 40, which is the same as for ROOT in file system 39. That is, the subdirectory 38 named SDIR2 becomes covered by ROOT 40.

Figure 5:
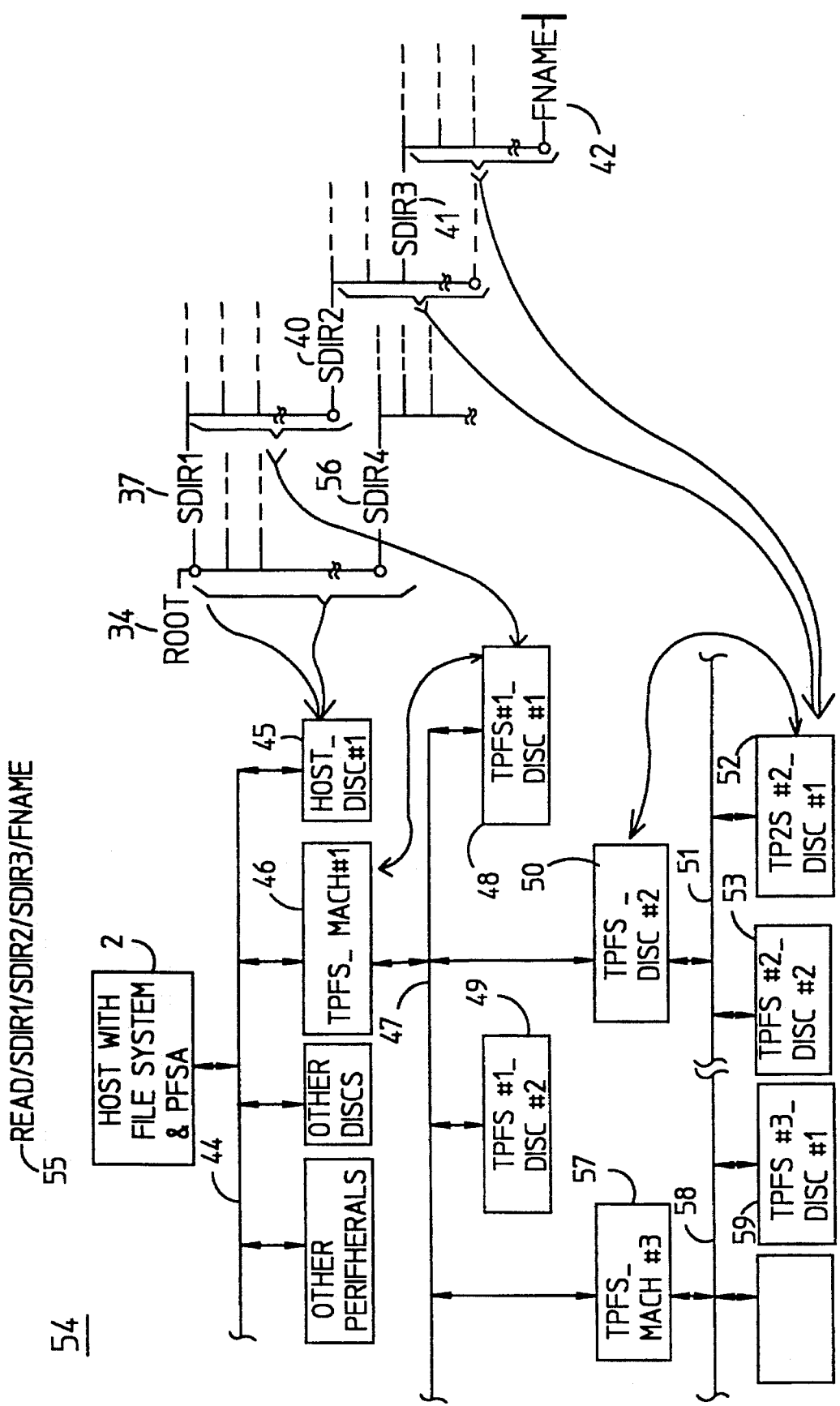
FIG. 5 is a simplified block diagram illustrating how remote peripheral file system machines of the sort depicted in FIG. 2 can be cascaded to facilitate the sort of file system mounting shown in FIG. 4.

Now refer to FIG. 5 and consider how this may be accomplished as an extension of the architecture of FIG. 2. To begin, note the arrangement 54 of the various machines. Host computer system 2 is equipped with a peripheral I/O bus 44 (e.g., SCSI or IEEE 488) which in turn is connected to a host (root) disc 45 (i.e., a random access mass storage device where ROOT 34 is located) and to a first TPFS machine 46 named TPFS_MACH#1. There could be other peripheral random access mass storage devices (discs) on bus 44. If there were, they would be managed in a conventional manner by the file system or other applications running on the host computer system 2.

The host side of TPFS_MACH#1 46 is connected to host computer system 2 by a first I/O bus 44. The peripheral side of TPFS_MACH#1 46 is connected to another (second) I/O bus 47, which is further connected to one or more discs 48 and 49, to the host side of a second TPFS machine 50, and possibly to other peripherals, as well. TPFS_MACH#1 46 must have some memory to manage, and unless it is equipped with or has access to a RAM disc (a possibility we discuss later), at least one actual random access mass storage device must be present on I/O bus 47.

The second TPFS machine 50 is named TPFS_MACH#2. Its peripheral side is connected to a third I/O bus 51, which in turn interconnects TPFS_MACH#2 with a disc 52 (or other random access mass storage device) named TPFS#2_DISC#1, and perhaps to other such discs 53.

The arrangement 54 depicted in FIG. 5 is innately capable of implementing the mounting of file systems, especially when those file systems are quite disparate owing to the dissimilar nature of the peripherals whose space they manage. The idea that brings this about is described in the paragraphs immediately below.

We begin with a definition. Associated with each TPFS machine is a "local region" that is described by path names that, supposing that the TPFS machine at hand is isolated and not mounted to any other file system, start at ROOT of the file system on that TPFS machine and then do not leave that machine. That is, the downstream end of such paths are either target files or are subdirectories containing mount points. In the latter case, there is a subdirectory with the right name in the file system, but it is covered, and the continuation of the desired path begins afresh as a different local region with the (renamed) ROOT directory of the file system mounted at that covered subdirectory. Thus, the local region of a TPFS machine is all the subdirectories (and the files that they contain) of a hierarchy that are on the TPFS machine by virtue of their being the ROOT itself or being between the ROOT (which may have been renamed if this file system has itself been mounted to another) and subdirectories covered by the ROOT's of other file systems. The "shape" of a local region can be irregular. One path leaving the ROOT "to the right" might have only a few levels of hierarchy, while one "leaving to the left" could have a great many.

Each instant TPFS machine in a chain of cascaded TPFS machines (46, 50 or 46, 57) receives a string of commands and parameters from the previous TPFS machine directly above, executes those commands, and in the process passes down to the next TPFS machine subsequent commands and parameters to satisfy received commands that are not directly executable within the local region of the instant TPFS machine. Each local region knows nothing of what goes on at local regions above it, and cares nothing about how actions to be performed at lower local regions are actually carried out. Downward communication between local regions is accomplished by sequences of re-issued commands of the same or diminishing scope, accompanied by their associated parameters. Upward communication consists of reply parameters and data that satisfy the execution of commands received from the local region above. These replies are expected by the issuing TPFS machine, and, for example, suspended processes therein are resumed as each machine receives its replies. All communication between the various local regions of the file system is according to the same generalized file operation description language (e.g., "vnode talk"); The TPFS's for each local region of the file system continue to use the appropriate hardware commands when interacting with the actual mass storage devices they manage directly. Broadly speaking, then, the recursive nature of how a modern hierarchial file system composed of mounted component file systems resolves its assigned activities is mirrored by the cascaded deployment of the implementing hardware/software combinations that are the TPFS machines, and by the resulting logical separation of the various random access mass storage devices they manage.

To be sure, the process described above is somewhat more complicated in its internal details than can be set out in such a brief summary; externally, however, the idea remains the elegant self-guided recursive division of labor among a cascaded chain of equally capable mechanisms each responsible for a different region in the hierarchy. To give the flavor of what actual traffic ensues, we offer the following simplified description of a particular example based on the composite hierarchial file system 43 of FIG. 4 as implemented by the arrangement 54 in FIG. 5.

Consider the command 55 READ/SDIR1/SDIR2/SDIR3/FNAME. This high level command would be encountered by the host operating system 7 as a command directly from the user (or perhaps from one of his batch files or from a script). The operating system 7 would convert this to a corresponding sequence of (somewhat more primitive) system calls, the arrangement of which accomplishes a READ operation. If the READ statement were originally in an executing compiled program then the compiler has probably already replaced the READ statement with the corresponding system calls, which then appear in the object code of the program.

According to our example, SDIR1 (subdirectory one) is located within the root directory ROOT 34 of the root disc HOST_DISC#1 45. The initial system calls pertain to an inspection of the contents of ROOT 34 in an attempt to determine if SDIR1 is contained therein. It is, but it is covered; it is a mount point for file system 36. The virtual file system 10 discovers this by an inspection of the tabular information it maintains about how to traverse itself. Additional such tabular information, created at the time file system 36 was mounted, indicates that the path to reach whatever is covering SDIR1 lies through the remote peripheral file system adapter 13. The sequence of system commands is thus directed to the adapter 13, where they are converted to their corresponding generic or universal file operation descriptors ("vnode talk"). TPFS machine #1 46 receives this stream of commands. Thus it is that ROOT 37 of file system 36, physically existing on TPFS_#1 DISC_#1 48, becomes the functional SDIR1. (We are not actually describing this particular part of things in their lowest level of detail. Those familiar with the internal operation of virtual file systems will appreciate that the vnode talk for finding an SDIR1 beyond the TPFS adapter 13 involves assigning a handle to the name SDIR1, and then issuing a LOOKUP command with associated parameters.)

In due course additional system calls are generated to continue with the next name in the chain, SDIR2. Now the object is to determine if SDIR2 can be located within SDIR1 37. It is, but SDIR2 is revealed to be covered; it is a mount point for file system 39. Now it is TPFS machine #1 46 that issues generic universal file operation descriptors to the local region below itself: TPFS_MACH#2 50. In like fashion SDIR2 40 is found to lie within the local region accessible to TPFS_MACH_#2 50. SDIR3 41 and the target file FNAME 42 are likewise directly managed by TPFS_MACH_#2 50. The ROOT 40 that functions as SDIR2 must physically reside on TPFS_#2 DISC_#1, as it functions as the root disc for TPFS machine #2. The file FNAME, however, might well be on another medium, however, such as TPFS_#2 DISC_#2 53.

In the example described above the mount points were one path-step or level of hierarchy apart. That need not be the case; they might be many levels apart. In such a case a TPFS machine manages a structure (its local region) of as many layers as are directly attached to its root directory, down as far as any mount points that are established within that structure.

Another way the example could be extended is to consider how things would be different if another subdirectory TDIR4 56 existed within SDIR1 37. Then it too could be become a mount point for the root of some other file system (not shown) existing on some disc 59. The physical analog to two mount points within the subdirectory SDIR1 37 is two TPFS machines on the peripheral side of TPFS_MACH_#1 46. The additional one is TPFS_MACH_#3 57, upon whose peripheral side is bus 58 and root disc TPFS_#3_DISC_#1 59. Note that commands directed to TPFS_#2 are ignored by TPFS_#3, and vice versa, since they each have a different address or ID number on bus 47. Such housekeeping details as what bus address or ID goes along with a given path within a local region is part of the tabular "how-to-traverse-myself,, information put into place when the file system on TPFS_MACH_#3 and disc 59 is mounted.

Figure 6:
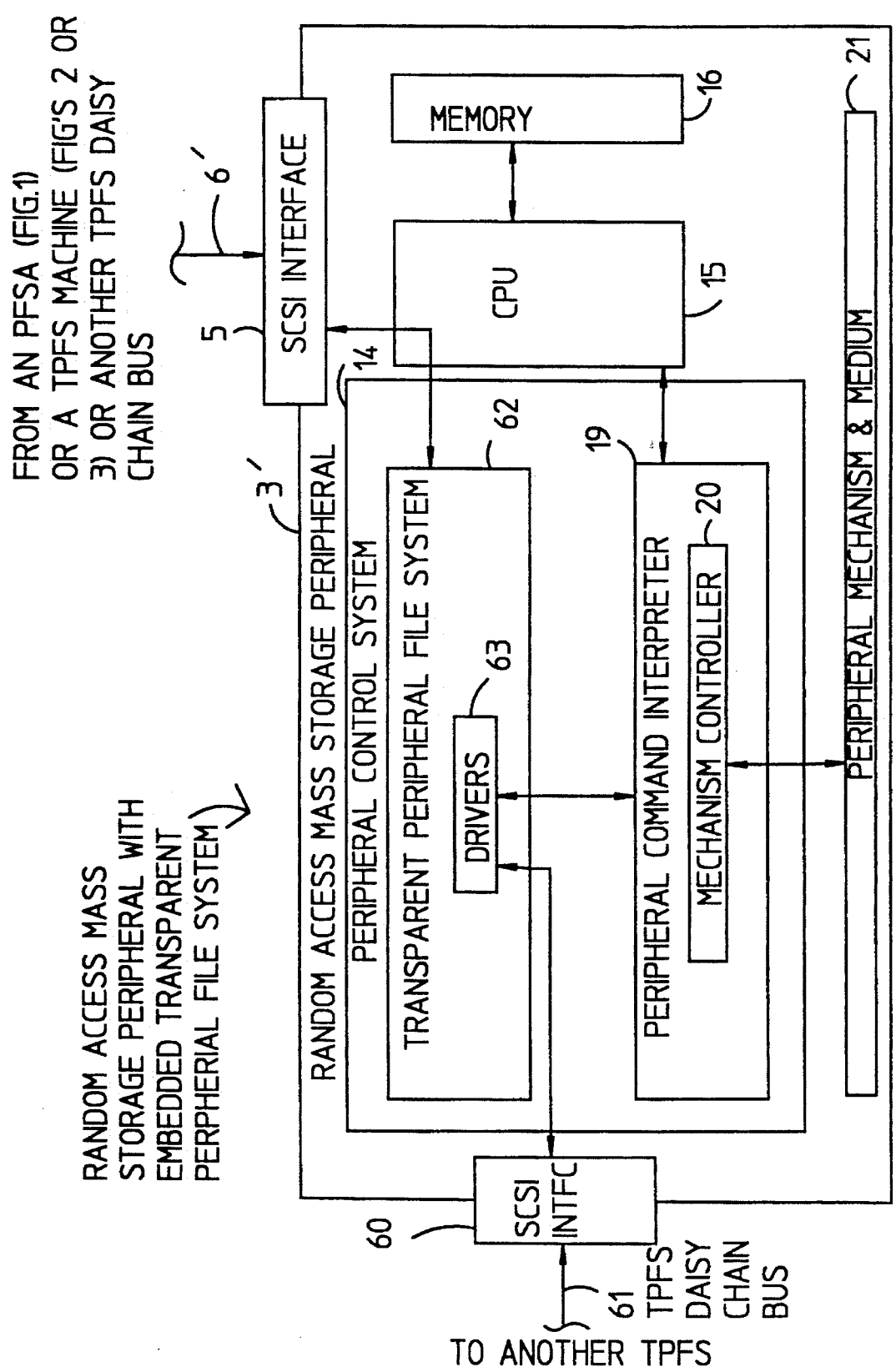
FIG. 6 is a simplified modification of the realization of FIG. 2 that allows it to have properties similar to those of the realization of FIG. 2.

We are now in a position to conclude this digression between FIGS. 2 and 3 by indicating with FIG. 6 what modifications are needed to the arrangement 1 in FIG. 1 to render it capable of the sort of operation which we have been discussing for FIG. 2. According to FIG. 6 the random access mass storage peripheral 3' has been augmented by the addition of an additional SCSI interface 60 coupled to drivers 63. Interface 60 establishes a TPFS daisy chain bus 61. This allows remote peripheral file system 62 to have the same flexibility in controlling additional lower levels of hierarchy (local regions) as found in the arrangement 22 of FIG. 2. Interface bus 6' can now originate with a TPFS adapter (after the fashion of FIG. 1), from a TPFS machine (a "lump" as in FIG. 2 or an I/O card as in FIG. 3—described below), or even from a TPFS daisy chain interface on another earlier instance of a random access mass storage peripheral 3' as shown in FIG. 6 itself. Likewise, either a TPFS machine ("lump"), another instance of random access mass storage peripheral 3' (of FIG. 6), or of peripheral 3 (of FIG. 1) may be connected to TPFS daisy chain bus 61.

Refer now to FIG. 3, wherein is shown yet another realization 64 of a preferred embodiment of a remote peripheral file system. In this figure the "lump in the cable" has been squeezed further toward the host computer system 2 until it finally becomes an I/O card 65 in an I/O slot in the backplane of the computer. Logically, things are pretty much as with FIG. 2, except that a layer of bus interfacing (4/6/24 in FIG. 2) has been eliminated. Except for the absent interface 24 (and probably a power supply, too!), I/O card 65 has the same architecture as TPFS machine 23 in FIG. 2. No further details of FIG. 3 need be described at this point.

Character To File Translator (CFX)

Sometimes users or their applications access a mass storage device in what may be termed a "raw mode". In a true raw mode the user expects the ability to exercise at least a minimal degree of actual low level control over the device, and exchange data simply as a stream of bytes or characters. Such raw mode mechanisms involve, then, a way to specify I/O operations, receive status information, and exchange streams of data bytes. It closely resembles driver-level activity (although more self-contained, so that the user need not really get dirty with other drivers, the interrupt system, DMA, etc.) and is in a way the very antithesis of a file system, since there is no intervening space manager imposing its own structures on the data. Given that users sometimes have the urge to do this, it is fair to ask how they can expect to do it when the mass storage device they wish to use is one that incorporates a TPFS.

At first glance it might seem sufficient to provide a privileged mode where the TPFS simply passes through to the storage device hardware commands from a raw mode driver. But this cannot safely be done unless there is a way to read and adjust the free list of the space manager in the TPFS or the medium is simply partitioned ahead of time. Either way leads to increased complexity and potential irrational side effects. We don't say that this couldn't be made to work; just that doing it that way is far too complicated and risky a solution, given that there is a simple and dependable alternative.

The solution is to emulate a true raw mode of access from the user's perspective, while in reality letting the space manager of the TPFS put the stuff in a file, anyway. There may be some small number of applications where such an ersatz raw mode won't do what the user really needs, (since he really does not, in fact, control what goes where) but it will suffice in the majority of applications.

The Character-To-File Translator (CFX) is a pseudo-driver that lets users or their applications read and write streams of bytes to and from a mass storage peripheral served by a Transparent Peripheral File System. It appears to be a tape driver to the host's operating system. It accepts and returns streams of bytes. It accepts some I/O control commands and communicates status information upon request. It provides an ersatz raw mode, since it surreptitiously converts the data to and from a file created for the purpose and treated by the TPFS as just another file.

Figure 7:
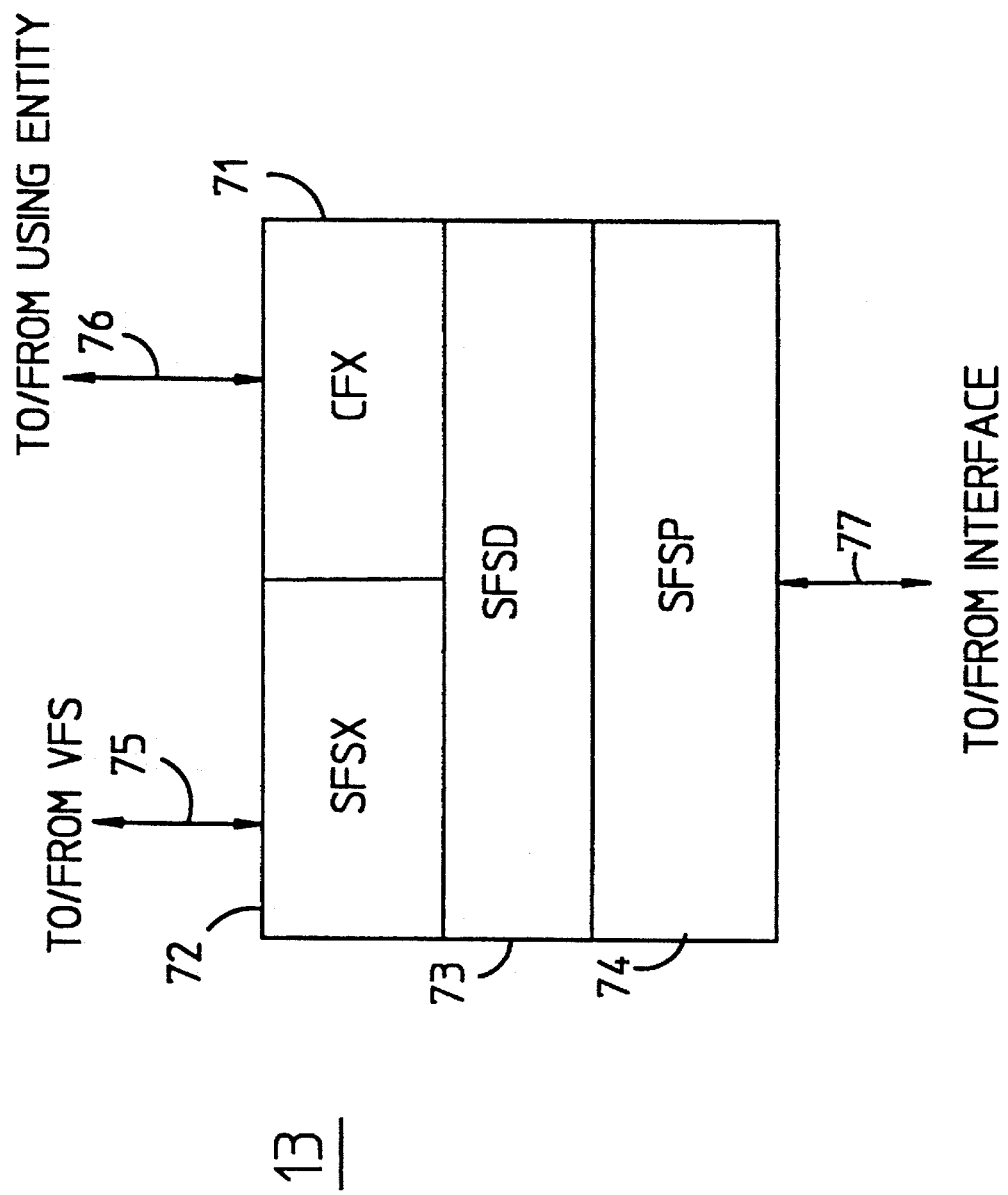
FIG. 7 is a software block diagram of the relationship between a character-to-file translator mechanism that emulates "raw mode" access to a mass storage device and other elements of transparent peripheral file system.

Referring now to FIG. 7, software routine CFX 71 cooperates with portions of the Peripheral File System Adapter (PFSA) 13. There is a portion 72 thereof called SFSX (explained in the Appendices) that operates via path 75 in conjunction with the VFS 10 in the host 2. SFSX 72 is the vnode level interface for file system operations; the functionality SFSX provides has been central to many of the discussions in the Specification. SFSX cooperates with SFSD 73 (SCSI File System Driver, also explained in the Appendices).

What CFX 71 does is provide an alternate raw mode path for using SFSD 73, without need for SFSX 72. Note that this means that a user or their application can perform ersatz raw mode access to the storage device of a TPFS even if the host computer system 2 does not include a VFS! (Which would mean that the TPFS would otherwise be unusable—but the (ersatz) "raw mode" access to the storage device would still work!)

CFX 71 communicates with the using agency via path 76 (function calls or driver entry points and the associated passing of parameters). CFX 71 receives via path 76 requests for ersatz raw mode operation (e.g., OPEN, CLOSE, READ, WRITE, as well as others that could be device dependent) and the associated stream of characters. CFX 71 converts these requests into corresponding file operations (CREATE, LOOKUP, READ, WRITE, ...) that are then passed to SFSD 73. CFX 71 will invent file names as needed. CFX 71 is also responsive to SFSD 73 for traffic in the direction of from SFSD to CFX, and sends to the using agency via path 76 character streams and associated status information.

Introduction To The Appendices

Source listings in C of a major portion of a preferred implementation of a TPFS and its PFSA have been included in Appendices A–E. These include PFSA code, which translates file system calls into file level commands, and TPFS code. The TPFS code interprets the commands, makes the appropriate calls into a file system, and also includes the actual file system code. The file system code included in these listing has been optimized to address issues associated with optical discs. Furthermore, an enhanced version has been included which provides support for transparent data compression. These listings have been divided into the following five Appendices:

Appendix A—SFS (an example of a PFSA)

Appendix B—DCP Parameter Utilities (used in the SFS-CS)

Appendix C—Transparent Peripheral File System Veneer

Appendix D—Optical File System (OSA)

Appendix E—Optical File System with Data Compression

Glossary of Terminology

The terminology used in each of the code segments of Appendices A–E evolved during the course of their development, bringing about a somewhat diverse array of names for the different segments. Before describing how all the segments work together, the following glossary is provided. It serves the dual purpose of: (1) introducing both certain concepts and division of labor; and, (2) defining specific terms. Because of this introductory nature it is deliberately placed ahead of the descriptions of the Appendices A–E.

General Terms

FLIP—"File Level Interface Protocol"
   This is the original name given to the file level commands across SCSI.

DCP—"Data Compression Protocol"
   This is an early name given to the set of file level commands defined to be used between the host's PFSA and the TPFS itself.
   Appendix B includes listings of the structures used in this protocol, as well as of utilities which implement the lowest levels of it.

DCFS—"Data Compression File System"

This is an early name given to the PFSA on the host. It came from the notion that the main user-perceived difference between a normal file system and DCFS would be that the data would be compressed (inside the TPFS on the peripheral) if DCFS were used, whereas any other file system would not use the file level commands (DCP) and would thus not have data compression.

SFS—"SCSI File System"

This is a later name given to the PFSA on the host. It comes from the fact that the host knows nothing about the file system except that it lies across SCSI somewhere.

OSA—"Optical Systems Architecture"

This is the name of the optical file system which was used as the core of the TPFS. This has evolved into the ECMA-167 and ISO-13346 standards. Appendices D and E both include listings of an implementation of this code.

FOX—"FLIP to OSA Translator"

This is the original name given to the code which translates file level commands into file system calls. This is more appropriately referred to as the veneer for the file system in the TPFS. Appendix C includes listings of the code performing this translation.

SFS-CS—"SFS Command Set"

This is the final name given to DCP and FLIP.

SFS-CS Terminology

SFS—"SCSI File System"

The SCSI File System (SFS) is not a file system per se, but presents a virtually mounted TPFS to the UNIX (tm) user. In order for the host to access the TPFS, it needs some method of communication, which includes both the hardware connect and the protocol/command set that is implemented over the hardware. As previously stated, the host is typically using the Virtual File System to manage its interface with any file system implemented below it. With the prevalence of both VFS and SCSI subsystems on hosts today, we developed the SFS command set that essentially sends VFS requests to the TPFS using the SCSI hardware.

SFS-Command Set

In order to send VFS requests across SCSI to the TPFS, new SCSI commands were defined and implemented, using the Vendor Unique Command Group (Group 6) that was left undefined by SCSI-2. By defining an opcode (in Group 6) and a command descriptor block (CDB) per VFS request, SFS can pass these requests to the TPFS for execution. SFS opcodes exist for core VFS request such as mount, statfs, create, read, write, etc. Refer to the dcpHeaders/dcp__cmds.h file in Appendix B for the complete list of opcodes. System dependent VFS requests such as access, fpathconf, etc, are not (presently) part of the SFS-Command Set (SFS-CS).

The CDB's for the commands vary based on the information that needs to be relayed for the command. All CDB's are 12 byte commands.

SFS-CS Concepts

While the host maintains vnodes and vfs structures for its files and file systems, it cannot share these data structures with the TPFS, it merely sends down commands to the TPFS. On the host, knowledge of which file/system to execute the command upon is defined by VFS layer (which sits above the actual filesystem) passing a variable which is a pointer to the memory containing a data structure which contains info about that particular file/system. Since the host SFS filesystem cannot share these data structures with the TPFS, it maintains in its vnode/vfs private data structure a unique "handle" that the TPFS gave it to use when sending commands related to that file. The TPFS must guarantee that this handle is unique for the time that file is active. For example:

Host: "I'm going to start using this file."
TPFS: Prepares a handle for it.
Host: Sends command to read handle.
TPFS: Sends handle (#26) to host.
Host: Read operation for file #26.
TPFS: Translates #26 to its own internal data structures, gathers the data and return it to the host.
Host: "I'm done with file #26."
TPFS: Is now free to use #26 to represent a totally different file if it wishes.

In terms of the SFS command set the above host commands correspond to:
lookup__file
get__file__info
read__file
file__inactive This handle is referred to as fileID in the SFS CDB's.

Note that get__file__info is a command that is coupled to the previous lookup__file command. This is because the VFS "lookup file" operation has bi-directional data flow associated with it. Data being passed down includes the directory file handle and the name of the file being looked up within the specified directory. Since the file name can not be part of the CDB, it is transferred to the TPFS during the DATA OUT phase of the lookup__file command. Since SCSI does not provide for bi-directional data phases associated with a single SCSI command, a second command is issued (get__file__info) that has a DATA IN phase so the host CPU may acquire the information it needs regarding the file.

For our purposes, we defined the information passed back about a file as its file handle and attributes. Since it is possible for a multi-tasking host to send down multiple lookup__file commands before a get__file__info command is sent down, the host needs a way to correlate data received from a specific get__file__info to a specific lookup__file command.

This is done through the use of command tagging. The lookup __file CDB has a 1 byte cmdtag field within it that the host fills in when it sends down the lookup__file CDB. When it is time for the host to send the get__ file__info command it fills the cmdtag field with the same value it used when sending down the lookup__file command. This way, the process that sent the lookup__ file command can be ensured that the get__file__info data that it gets back correlates to the lookup__file command. Each process will have its own cmdtag.

The SFS commands root, lookup__file, getattr, create, mkdir, and lookup__FID are all coupled with the get__ file__info command.

Note that use of command tagging within SFS-CS does not preclude the use of SCSI command queuing. Command queuing would allow interleaving of SFS commands, and could potentially do away with any polling get__file__info commands, which is already provided for in the SFS-CS.

Guide To The Appendices

Appendix A

Appendix A contains a listing of the SFS code that allows a TPFS to be virtually mounted on a host CPU. It was designed in three (logical) layers: SFSX, SFSD, and SFSP. The reason for the layered design was to create clear functional boundaries between code modules and also make the code more portable across (mostly UNIX (tm) ) platforms.

SFSX:

FILES: sfsx.c, sfsx.h, sfsx_machd.c, sfsx_machd.h

SFSX is the SFS translator—it maintains the vfs operations interface (or API) to VFS. When a request comes down from VFS, SFSX will translate from the vnode to file handle domain, and pass the request down to SFSD. SFSX is also responsible for checking permissions & access to TPFS files. SFSX contains info about the attributes of the remote file and information about the process trying to access that file (i.e., access type, user/group id's, access control list, etc). This type of information is host dependent and therefore the control best belongs in the host.

SFSD:

FILES: sfsd.c, sfsd.h

This is the SFS driver. It contains information about the SFS command set, which SFS commands are coupled together (i.e., lookup and get file info), and how to encode/decode data sent to/from the TPFS. This layer is meant to be very host independent. Once the SFSD has packaged together a command it passes it off to SFSP.

SFSP:

FILES: dc_ll.c, dc_ll.h:

This is the SFS pass-thru code layer. This layer is extremely host dependent. It is basically an API for SFSD that will communicate with the host's SCSI driver to pass the SFSD requests to the TPFS. Typically, each host will have it's own type of SCSI pass through mechanism involving different procedure calls and variable/state initialization. (Indeed, for HP's series 700 computer this mechanism has changed from release 8.07 to 9.0.)

CFX:

FILES: cfx.c, cfx.h:

This code shows how a tape driver could be built out of the SFS-CS. CFX stands for Character to File translator. It has the standard character driver entry point: open, close, read, write, ioctl. It is mostly example code, but use was made of the ioctl() entry point in order to send "make file system" type commands down to TPFS. The code in cfx.c is minor and layers on top of (makes calls to) the SFSD layer.

Appendix B (DCP Parameter Utilities)

Appendix B contains a listing of some low-level functions used to pack and unpack the lowest-level pieces of the special file level commands. Note that the exact same source code is used by both the TPFS CPU as well as the host CPU.

In DCP, parameters are used to send and receive information normally passed as arguments in file system calls. They are required in order for this information to pass between the PFSA and the TPFS. They are encoded into and passed inside the data phase of the SCSI command. Parameters going to the TPFS are sent in the DATA OUT phase, while parameters coming back to the PFSA are in the DATA IN phase.

The parameters are passed in null-terminated lists. Each entry in the list includes the type of parameter, as well as its length. This allows the utilities to search for specific parameters in the list by the parameter type field. This also allows for optional parameters and for new parameters to be added to the list without changing any of the code which accesses the other parameters.

The parameter-passing scheme here is the lowest common denominator of DCP. By having the same code run on both the host and the peripheral, most compatibility issues are resolved. This is the strength of the parameter list concept. Note that there is still much machine and compiler dependence in the implementation of structures, so the fewer structures that are shared, the better.

One approach to this would be to make the parameter the only shared structure. All other shared structures could be built on top of it. This would substantially improve the portability of the PFSA code.

First, the dcpHeaders/*.h files are listed. These define the data structures which must be shared between the host and the TPFS. Then, the dcpUtil/dcp_parms.c file is listed. It contains the code which does the parameter list manipulation.

dcpHeaders/dcp_attr.h

This contains the definitions of the attribute structure, used like the 'struct vattr'.

dcpHeaders/dcp_cmds.h

This defines all of the different dcp commands, and documents which parameters they use/require.

dcpHeaders/dcp_data.h

This defines all the different parameter types, as well as how parameter lists are constructed.

dcpHeaders/dcp_dir.h

This defines the structure used for reading directories from the TPFS.

dcpHeaders/dcp_fid.h

This defines what a FID is like in DCP. This is used by the fid() and vget() functions.

dcpHeaders/dcp_parms.h

This defines the prototypes for the functions in dcpUtil/dcp_parms.c.

dcpHeaders/dcp_statfs.h

This defines the structure used to return information about the file system when a statfs() call is made. This includes how much space has been used, how much is free, etc.

dcpHeaders/dcp_types.h

This defines some of the lowest level types. This is mainly to remove any system-dependent ambiguities (e.g., in the meaning of 'int') by explicitly defining all component types used in the other dcp structures in terms of other system types.

dcpUtil/dcp_parms.c

This is the code for packing and unpacking lists of parameters. Parameters are passed between TPFS and the PFSA encoded inside the data_in or data_out byte stream.

Note that the most robust parameter-list-building utility is put_parm(), which essentially appends a new parameter onto an existing list. When retrieving parameters from a list, find_parm() or copy_parm() may be used, depending on whether or not a separate copy of the parameter is required.

Appendix C (TPFS Veneer)

Appendix C contains listings of the files implementing the conversion from the DCP commands and parameters to the file stem calls. It is called the "veneer" of the file system, in that it presents all the functionality of the file system through a system-specific interface. It consists of two files:

osaSys/veneer.c

This file contains the veneer for the normal VFS operations, such as creating, destroying, renaming, and linking directories and files, as well as writing to files and reading files and directories.

The heart of this code is the function fox(), which takes in the system-specific structure representing a SCSI command, (a'struct command_descriptor *' in this case) and performs the operation requested. It cases on the command in the SCSI cdb, pulls the required arguments for the file system call from the parameter list as required, calls the appropriate vnode or vfs function, sets the error code if non-zero, and sends a message to the process implementing SCSI target code saying that it is done.

To the file system below, it appears to be the host operating system, calling its vnode and vfs functions. The file level commands, however, are originating at the true host, and fox() is simply translating the DCP requests into vnode calls.

Note that if the command is not a file level command, it sends it directly down to the appropriate device as is.

Also in this file are utilities to convert TPFS system-specific structures to and from the dcp structures. For example, pltova() finds the P_ATTR parameter in the parameter list and copies it into supplied the vattr structure. Also, fhtovp() translates from the file handle ("fh") used in DCP to a vnode pointer ("vp"), used in the file system calls.

This also uses arrays in order to implement the DCPgetinfo command. These arrays hold the results of tagged commands (using the field "dcpcmdtag") from when the command completes till when the host asks for the results using the DCPgetinfo command.

osaSys/vmakefs.c

This file contains the makefs_dcp() function, which is called by the veneer upon receiving the appropriate DCP command. Note that it is separate only because the function of making a file system is normally separated from the VFS calls.

Appendix D (Optical File System (OSA))

Appendix D contains listings of a file system designed for optical storage. It does not require optical media, and is thus suitable for winchester disk drives; however, it was particularly optimized for write once and rewritable optical media. It is provided here as an example of a file system which may be implemented inside a TPFS, and which addresses some of the issues raised by a specific storage technology.

WORM Support

The "inode" equivalent structure (termed and "onode") has been modified to allow it to be rewritten even on write-once media. This makes it handle WORM transparently to the user. Files and directories may be rewritten, created, and destroyed. This happens, of course, at the cost of decreasing capacity, but with the benefit that any version of a file may be retrieved from the disc.

Rewritable Optical Support

This file system incorporates a free space structure which is a bitmap with a bit for each sector. It allows two bitmaps: one for unerased sectors, and one for erased sectors. This allows the erasure to be done separately from the writing, which can yield higher performance on writes to rewritable optical discs.

General Purpose

The code given here is suitable for, and has been ported to three major operating systems: Sun (Unix), Macintosh, and MS-DOS. It is therefore properly viewed as a generic file system, supporting all that is unique about each of these systems. This file system was, in fact, the starting point for the ANSI X3B11.1 committee which defined a file interchange format for Write Once and Rewritable optical media. This has become the ECMA-167 and ISO 13346 standards.

Fits TPFS Well

This file system, then provides a good example of a file system which is suitable for multiple hosts, file interchange between multiple hosts, and removable optical storage in particular. This is just the sort of file system which fits well in a TPFS.

Code Description

This code looks from the outside just like any other file system on unix. It supports all the main vnode operations, and is basically ready to compile and link into the kernel. What it needs is for the low level utilities to be mapped into the appropriate system calls, and for its fs structure to be linked into the host's vnode chain (or array, as the case may be). The code is divided into four directories and associated files.

coreCode/

This contains all the code which implements the file system proper.

osaHeaders/

This contains the header files for the file system.

sysFiles/

This contains all the system-specific code, providing the links between the core code and a host's execution environment.

utilities/

This contains the code for the makefs utility. This is separate, since creating a file system is not normally a vnode operation, but is typically a separate program.

coreCode/o_dir.c o_dir.c contains the code which implements directory operations.

coreCode/o_fat.c o_fat.c contains the code which manipulates the File Allocation Tables in the file system.

coreCode/o_onode.c o_onode.c contains the code which concerns "onodes", the equivalent of "inodes" in this file system.

coreCode/o_struct.c o_struct.c contains the code which lies between the disk structures and the in-memory structures.

coreCode/o_vfsops.c o_vfsops.c contains the code which performs the VFS functions, such as otfs_sync ( ), otfs_statfs ( ), etc.

coreCode/o_vndops.c o_vndops.c contains the code which implements all the vnode operations, which is all the basic file level operations.

osaHeaders/def.h def.h contains the #defines and type definitions used by the rest of the code. This is included by all the other code.

osaHeaders/errno.h errno.h contains error code definitions.

osaHeaders/o_fs.h o_fs.h contains declarations concerning the file system.

osaHeaders/o_node.h o_node.h contains definitions of flags used by the vnode/ otnode.

osaHeaders/o_proto.h o_proto.h contains the function prototypes for all the file system functions.

osaHeaders/o_vfsops.h o_vfsops.h contains #include statements for all the files that should be included in order to make otfs_xxx() (vfs) calls.

osaHeaders/o_vndops.h o_vndops.h contains #include statements for all the files that should be included in order to make otvn_xxx() (vnode) calls.

osaHeaders/osa.h osa.h contains the definitions of all the structures specific to the file system.

osaHeaders/vnode.h vnode.h contains the definitions of the vnode structures including the vnode structure itself, the vattr structure (for file attributes) and the macros which are used to make vnode calls.

sysFiles/kwrrd.c kwrrd.c contains definitions of some low-level reading and writing routines.

sysFiles/o_sys.c o_sys.c contains most of the system-specific functions used by the file system. This includes the mount/ unmount functions, the time and date functions, the kernel functions (e.g., bzero(), etc.) plus the SCSI access functions (e.g., ot_read()). This file is a centralization of the system-specific functions, and it is intended that all of these be modified in order to get the code to run in a given environment.

sysFiles/veneer.c veneer.c contains an extra layer of functions which go on top of the vfs and vnode functions. They perform the locking and unlocking of the file system to prevent multiple interleaved fs calls from interfering with each other.

utilities/makefile makefile is used to make the makefs program.

utilities/makefs.c makefs.c contains the code which performs the initialization of a file system volume and file system on a disc.

utilities/makefs.h makefs.h contains all the #include statements required by makefs.c and mveneer.c. It also defines the data structures shared by both files' functions.

utilities/mveneer.c mveneer.c contains the veneer for the makefs code. It implements a makefs unix command, taking in command line arguments and passing the information along to the makefs code.

Appendix E (Optical File System with Data Compression)

Appendix E contains listings of the code for the same file system in Appendix D, modified to transparently provide data compression. The code is divided into four directories that are similar to those in Appendix D, though the names of these directories have been changed somewhat:

osaCore/is analogous to coreCode/.

osaSys/is analogous to sysFiles/.

osaUtil/is analogous to utilities/.

osaCore/o_dc.c o_dc.c contains the code to perform data compression inside the file system. Note that the details of compression algorithm have been intentionally omitted. However, the functions ot_cwrite() and ot_cread() are included. These are called from the ot_writeData() and ot_readData(), respectively, when it is ready to write or read the data to or from the disk.

The basic approach of ot_cwrite() is to compress as much of the data as possible into the space supplied to it, and then writes this data to the disk. This piece of contiguous disk space becomes an extent of the file being written. Extents are compressed and decompressed independently. If the compression process expands the data (this happens when the data has too little redundancy), the uncompressed version of the data is used. The implementation shown makes sure that each extent is an integral number of sectors long, by rounding up the compressed length. It also rounds down the uncompressed length, so that both the uncompressed and compressed lengths are integral multiples of the sector size.

o_compress() performs the compression operation on the data. It returns when it either runs out of data to compress or when it runs out of room for the compressed data.

ot_cread() simply reads an extent and decompresses an arbitrary portion of it.

o_decompress() performs the decompression of an extent. It must be supplied with an entire physical extent, since decompression must start at the beginning of the extent. However, it also supports requests for decompressing only part of an extent.

osaCore/o_vndops.c o_vndops.c contains much of the code controlling data compression, including the code to write compressed data to a file and to read compressed data from a file. Several of the functions have been modified:

otvn_create() was changed in order to mark all files it creates with the appropriate allow/disallow compression stamp, according to whether the file system flags allow or disallow compression.

ot_readData() was changed to call ot_cread() if the extent is marked as compressed and to call ot_read() if not.

ot_writeData() was changed to use ot cwrite() instead of ot_write() if compression is enabled for the file it is writing to. It also changed to return all unused space back to the free list after compression is completed.

Note that this code provides an example of how a file system could integrate all the issues of data compression into its reading and writing processes. The write code provided here demonstrates how to append to a file on sector boundaries. It does not show how to perform update-in-place or to write to non-sector boundaries. These more complex operations which are less frequently required of file systems may be built from the simpler ones shown here. Alternatively, another layer could be put on top of the file system which could support these operations by decompressing entire files, performing the operation, and then recompressing the files. This implementation therefore represents the core of a file system which includes data decompression as an integrated part of its space management.

osaHeaders/o_dc.h o_dc.h defines the structures used to pass information about compression and decompression to and from the o_dc.c functions.

osaHeaders/osa.h osa.h defines the structures used by the file system. Changes for data compression here include the ExtComp and otfat structures. These structure are used to hold information about extents. Also included is the FileCmp structure, which is used to mark a file as allowing or disallowing data compression to occur on the its extents. The space structure also changed to hold information as to whether or not the data held in it has been compressed or not.

We claim:

1. In a host computer system including an application environment within which originate commands for a mass storage file system at least a portion of which is a transparent peripheral file system embedded in a random access mass storage peripheral, the combination comprising:

a. a host computer including an execution environment within which originate commands for a mass storage file system;

b. a virtual file system within the host computer, that accepts from the execution environment file system commands pertaining to an embedded actual file system, that routs those file system commands to the embedded actual file system and that subsequently exchanges data and status information between the execution environment and the embedded actual file system pursuant to the execution of a file system command;

c. a peripheral file system adapter, responsive to the virtual file system, that appears to be the embedded actual file system to the virtual file system while instead conveying, via a peripheral interface bus, file system commands pertaining to the embedded actual file system that is within the random access mass storage peripheral recited in (d) below, and that also subsequently exchanges data and status information between that random access mass storage peripheral and the virtual file system pursuant to the execution of a file system command; and d. a random access mass storage peripheral, coupled to the peripheral file system adapter without an intervening file server for space management, and including an embedded actual file system that stores and retrieves data on a medium of the random access mass storage peripheral in response to file system commands pertaining to that embedded actual file system and which originate with execution environment within the host computer, the embedded actual file system having a space management paradigm adapted to the particular way the random access mass storage peripheral reads and writes data.

2. A combination as in claim 1 wherein the peripheral interface bus comprises first and second interfaces interconnected by a cable, the combination of the first and second interfaces and their interconnecting cable being interposed between and coupled to each of the peripheral file system adapter and the random access mass storage peripheral.

3. A combination as in claim 1 wherein the random access mass storage peripheral further comprises a microprocessor based embedded control system that implements the embedded actual file system and that also implements a peripheral command interpreter which in turn controls a peripheral mechanism in response to commands comprising a hardware command set and issued by the embedded actual file system.

4. A combination as in claim 3 wherein the commands issued by the embedded actual file system are additionally coupled to an additional interface interconnectable with a random access mass storage device.

5. A combination as in claim 4 wherein the commands issued by the embedded actual file system may additionally include file system commands and the random access mass storage device comprises another random access mass storage peripheral.

6. A combination as in claim 1 wherein the embedded actual file system within the random access mass storage peripheral performs data compression and decompression upon the information stored on and retrieved from the peripheral mechanism.

7. A combination as in claim 1 wherein the random access mass storage peripheral further comprises an optical disc drive.

8. A combination as in claim 7 wherein the random access mass storage peripheral further comprises an autochanger, and further wherein the embedded actual file system controls the autochanger.

9. A combination as in claim 7 wherein the optical disc drive is a WORM drive.

10. A combination as in claim 1 wherein the medium of the random access mass storage peripheral is of a type requiring that locations already written to have separate erase operations thereupon prior to being written to again, and further wherein the embedded actual file system pre-erases recoverable locations on the storage medium during times when it would otherwise be idle, maintains a list of pre-erased locations, and uses listed pre-erased locations to fulfill requested write operations.

11. A combination as in claim 1 wherein the random access mass storage peripheral is a magnetic disc drive.

12. A transparent peripheral file system comprising:

a. a host computer including an execution environment within which originate commands for a mass storage file system;

b. a virtual file system executed by the host computer and that accepts, from the execution environment, file system commands pertaining to the peripheral file system recited in (d) below, that routs those file system commands to the peripheral file system and that subsequently exchanges, pursuant to the execution of a file system command, data and status information between, and only between, the peripheral file system and the execution environment of the host computer;

c. a peripheral file system adapter, responsive exclusively to the virtual file system, that appears to be the peripheral file system to the virtual file system, while instead conveying to the peripheral file system recited in (d) below file system commands pertaining to the peripheral file system, and that also subsequently exchanges data and status information between only that peripheral file system and the virtual file system pursuant to the execution of a file system command;

d. a peripheral file system, coupled to the peripheral file system adapter, the peripheral file system responding to exclusively the file system adapter by storing and retrieving data on the medium of the random access mass storage peripheral recited in (e) below by issuing commands comprising a hardware command set for that random access mass storage peripheral, the peripheral file system having a space management paradigm adapted to the particular way the random access mass storage peripheral reads and writes data; and e. a random access mass storage peripheral, coupled to the peripheral file system and responsive exclusively to hardware commands issued therefrom.

13. A transparent peripheral file system as in claim 12 further comprising first and second interfaces interconnected by a cable, the combination of the first and second interfaces and their interconnecting cable being interposed between and coupled to each of the peripheral file system adapter and the peripheral file system.

14. A transparent peripheral file system as in claim 12 wherein the peripheral file system further comprises a microprocessor based embedded control system that implements the peripheral file system.

15. A transparent peripheral file system as in claim 12 wherein the peripheral file system performs data compression and decompression upon the information stored on and retrieved from the random access mass storage peripheral.

16. A transparent peripheral file system as in claim 12 wherein the random access mass storage peripheral further comprises an optical disc drive.

17. A transparent peripheral file system as in claim 16 wherein the random access mass storage peripheral further comprises an autochanger, and further wherein the peripheral file system controls the autochanger.

18. A transparent peripheral file system as in claim 16 wherein the optical disc drive is a WORM drive.

19. A transparent peripheral file system as in claim 12 wherein the medium of the random access mass storage peripheral is of a type requiring that locations already written to have separate erase operations thereupon prior to being written to again, and further wherein the peripheral file system pre-erases recoverable locations on the storage medium during times when it would otherwise be idle, maintains a list of pre-erased locations, and uses listed pre-erased locations to fulfill requested write operations.

20. A transparent peripheral file system as in claim 12 wherein the random access mass storage peripheral is a magnetic disc drive.

21. A random access storage device responsive to file system commands for the storage and retrieval of information, the random access storage device comprising:

an interface that receives file system commands and that also transfers information to and from the random access storage device;

a storage mechanism that writes information to and reads information from a storage medium;

a command execution system, coupled to the interface and to the storage mechanism, that recognizes file system commands received by the interface and that also accomplishes those commands by initiating and controlling sequences of storage mechanism actions that read and write as files the information written to and read from the storage medium; and a data compressor/decompressor, responsive to the command execution system, having a first port coupled to the interface and also having a second port coupled to the storage mechanism, that compresses and decompresses information, during compression the first port receiving file information to be compressed and the second port presenting to the storage mechanism the resulting compressed file information, while during decompression the second port receiving from the storage mechanism compressed file information to be decompressed and the first port presenting to the interface the resulting decompressed file information.

22. A random access storage device as in claim 21 wherein the file system commands for the storage and retrieval of information are generalized file operation descriptors representing native file system operations issued to a computer operating system but that are performed by one of a plurality of target file systems that are separate from the native file system of the operating system, and further wherein the sequence of storage mechanism actions initiated by the command execution system implements one of those target file systems.

\* \* \* \* \*